(12) United States Patent
Hall

(10) Patent No.: US 9,201,975 B2
(45) Date of Patent: Dec. 1, 2015

(54) EXCHANGE OF DYNAMICALLY UPDATED DATA USING MATRIX BAR CODES

(71) Applicant: BusinessCardRegistry.com, Inc., Encinitas, CA (US)

(72) Inventor: David George Hall, Austin, TX (US)

(*) Notice: Subject to any disclaimer, the term of this patent is extended or adjusted under 35 U.S.C. 154(b) by 0 days.

(21) Appl. No.: 13/841,953

(22) Filed: Mar. 15, 2013

(65) Prior Publication Data

US 2013/0240618 A1   Sep. 19, 2013

Related U.S. Application Data

(60) Provisional application No. 61/685,336, filed on Mar. 15, 2012.

(51) Int. Cl.
*G06F 17/00* (2006.01)
*G06F 17/30* (2006.01)

(52) U.S. Cl.
CPC .... *G06F 17/30873* (2013.01); *G06F 17/30879* (2013.01)

(58) Field of Classification Search
CPC .............................. G06F 17/00; G06F 17/2235
USPC ........... 235/375, 462.01, 462.09; 707/999.01, 707/999.001, 999.003; 709/225
See application file for complete search history.

(56) References Cited

U.S. PATENT DOCUMENTS

| | | | |
|---|---|---|---|
| 6,012,102 A * | 1/2000 | Shachar | 710/5 |
| 7,221,910 B2 * | 5/2007 | Ishii et al. | 455/41.2 |
| 7,350,708 B2 | 4/2008 | Melick et al. | |
| 7,798,417 B2 | 9/2010 | Snyder et al. | |
| 8,271,346 B1 | 9/2012 | Smith | |
| 8,282,001 B2 | 10/2012 | Snyder et al. | |
| 8,573,499 B1 * | 11/2013 | Boyle | 235/462.09 |
| 2005/0143126 A1 * | 6/2005 | Chipchase | 455/557 |
| 2006/0068816 A1 * | 3/2006 | Pelaez et al. | 455/466 |
| 2006/0123041 A1 * | 6/2006 | Sandrini et al. | 707/102 |
| 2006/0277213 A1 * | 12/2006 | Robertson et al. | 707/102 |
| 2007/0136255 A1 * | 6/2007 | Rizzo et al. | 707/3 |
| 2007/0266156 A1 * | 11/2007 | Wilkins | 709/225 |
| 2008/0209329 A1 * | 8/2008 | DeFranco et al. | 715/733 |
| 2009/0150488 A1 * | 6/2009 | Martin-Cocher et al. | 709/204 |
| 2009/0254971 A1 * | 10/2009 | Herz et al. | 726/1 |
| 2011/0101086 A1 * | 5/2011 | Yach | 235/375 |
| 2012/0233013 A1 | 9/2012 | Smith | |
| 2012/0265694 A1 | 10/2012 | Tuchman et al. | |
| 2012/0290480 A1 | 11/2012 | Chen | |
| 2013/0043302 A1 | 2/2013 | Powlen et al. | |

* cited by examiner

*Primary Examiner* — Thien M Le
*Assistant Examiner* — Claude J Brown
(74) *Attorney, Agent, or Firm* — Genius Patent APC; Bruce Hare

(57) ABSTRACT

An automated method adapted to allow sharing of information among a set of users is described. The method includes: performing a user sign up operation for each particular user in the set of users; generating a graphic code and an exchange uniform resource locator (URL) associated with each particular user; and providing a web page accessible at the URL. An automated method adapted to perform multi-directional sharing among a set of users is also described. The method includes: scanning a graphic code using a user device associated with a particular user; navigating to a uniform resource locator (URL) based at least partly on information received by scanning the graphic code; and sending a first set of information fields associated with the particular user to a user associated with the graphic code. An application may include: a camera interaction module; a processing module; and a communication module.

20 Claims, 17 Drawing Sheets

EXCHANGE OF DYNAMICALLY UPDATED DATA USING MATRIX BAR CODES

CROSS-REFERENCE TO RELATED APPLICATIONS

This application claims priority to U.S. Provisional Patent Application Ser. No. 61/685,336, filed on Mar. 15, 2012.

BACKGROUND

Various ways of scanning of visual graphics to retrieve information are currently available. For example, many mobile device applications allow scanning of matrix bar codes (e.g., quick response, or "QR", codes) that may include various sets of data included in a graphical display area. Typically, such embedded data may include a uniform resource locator (or "URL", "web address", or "link", etc.) that points to a particular web site associated with the QR code. However, the website may not receive any information from or about the user when the user accesses the site through the QR code.

In addition, many applications require data transfer among a sub-set of users (e.g., contact information between a first and second user). For instance, a user of a social networking site may wish to send data to a set of selected users and receive associated data back from a the set of selected users (or a sub-set thereof).

Lead Retrieval systems are widely used at networking events where each attendee is associated with a bar code. Bar code scanners are then used to create a one way exchange of information (i.e., fixed information regarding each attendee may be encoded into the bar code). If, for example, an attendee's information is incorrect (or needs to be updated, etc.), the attendee would have to have a new bar code generated.

Therefore there exists a need for a graphical code that allows an automated two-way exchange of dynamically updateable information among appropriate parties.

BRIEF SUMMARY

Some embodiments may provide a matrix bar code-triggered (and/or link-triggered) two-way exchange of data among entities. In some embodiments, participating users (or "members") may be automatically placed in an affiliate program in order to be eligible to receive benefits for introducing other users.

Some embodiments provide an information exchange application that may be accessible via a website using any appropriate device (e.g., a smartphone, a tablet device, a personal computer or "PC", etc.). A user may be allowed to sign up for an account by entering some set of mandatory information (e.g., a username, password, email address, first name, last name, company name, industry, profession, security setting, and/or other appropriate fields). Some embodiments may collect additional optional information (e.g., address, city, state, office phone, mobile phone, fax, position, website, photo, mobile phone operating system, social network profile URL(s), biography, and/or other appropriate fields).

Some embodiments may utilize the collected information to generate a user profile page. The user may also be associated with an online contact list and/or an exchange code. In some embodiments, if a user scans the exchange code of another user, a two-way exchange of contact information is performed. A contact information profile ("CIP") may be generated using the information in the profile of each user, and each CIP may be added to the contact list of the other user.

The user scanning the exchange code may automatically give consent for the CIP to be sent to the user associated with the exchange code, based on the act of scanning the exchange code of the other user. However, each user has the ability to select whether a full CIP is automatically provide when another member scans the exchange code associated with the user or whether approval is required before full profile information is provided.

If the user associated with the scanned exchange code has selected automatic approval, then a full CIP will be exchanged with the other user immediately upon scanning of the code. Thus, the information in the profile of the user associated with the scanned exchange code will immediately become visible to the other user through the user's contact list. In such a case, if a first user scans the exchange code of another user, the first user may be immediately taken to the CIP of the other member within the user's contact list.

However, if the user associated with the scanned exchange code has selected approval required, only a limited CIP will be immediately exchanged. Such a limited CIP may include, for instance, only a photo, name and company of that user. A message (or other type of notification) may then notify the user that a request has been made. The user may be able to approve or deny the exchange request. If the request is denied, no further information may be exchanged. If the request is approved, then the full CIP may be added to the contact list of the other user.

When a person using the barcode scanning application of some embodiments scans the exchange code of a user, if the browser attempting to access the website is not currently logged in to an active user account, the user may be asked to either sign in or sign up for an account before the contact information exchange may be completed.

When a new member is introduced to the system and a user profile is created, the system of some embodiments may automatically track two generations of referring affiliates and associate the affiliates with the user profile (e.g., as a first tier referring affiliate and a second tier referring affiliate). Such affiliates may earn various rewards or benefits based at least partly on such referrals.

Some embodiments allow for the generation of marketing codes. Such codes include the functionality of the CIP exchange, except that the final destination URL for the user who initiates the CIP exchange by scanning the marketing code. The user associated with the marketing code may be able to specify the final destination URL that a user will reach after scanning the marketing code. Thus, marketing codes may allow a first user to direct a second user to any webpage while also collecting the CIP of the second user.

Some embodiments may allow a user to scan a code, be directed to a URL, and have a response form (or other appropriate element) automatically populated with user information (e.g., name, address, etc.).

A first exemplary embodiment of the invention provides an automated method adapted to perform multi-directional sharing among a set of users. The method includes: scanning a graphic code using a user device associated with a particular user; navigating to a uniform resource locator (URL) based at least partly on information received by scanning the graphic code; and sending a first set of information fields associated with the particular user to a user associated with the graphic code.

A second exemplary embodiment of the invention provides a user device application adapted to allow a user to initiate a multi-directional transfer of information. The application includes: a camera interaction module adapted to control a camera associated with the user device in order to scan a graphic code; a processing module adapted to analyze the scanned graphic code and determine a uniform resource locator (URL) embedded within the graphic code; and a communication module adapted to navigate to the URL across one or more networks.

A third exemplary embodiment of the invention provides an automated method adapted to allow sharing of information among a set of users. The method includes: performing a user sign up operation for each particular user in the set of users; generating a graphic code and an exchange uniform resource locator (URL) associated with each particular user; and providing a web page accessible at the URL.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

Figure 1:
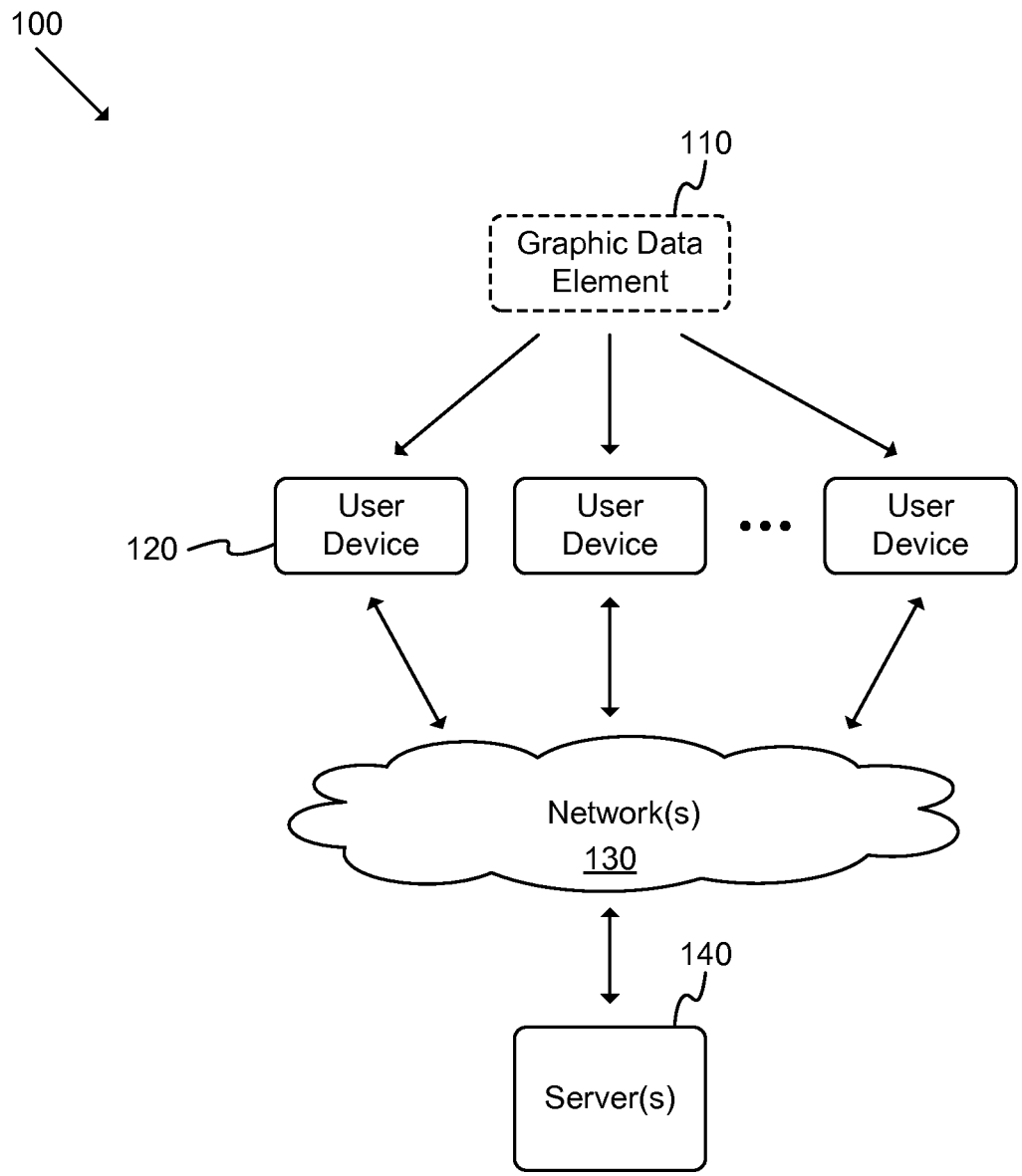
FIG. 1 illustrates a schematic block diagram of a conceptual system according to an exemplary embodiment the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Several more detailed embodiments of the invention are described in the sections below. Section I provides a conceptual overview of some embodiments. Section II then describes a conceptual system provided by some embodiments. Next, section III describes various exemplary methods of operation used by some embodiments. Finally, Section IV describes a computer system which implements some of the embodiments of the invention.

I. Overview

Sub-section I.A provides a conceptual description of a system of some embodiments. Sub-section I.B then describes an overview of a conceptual process used to implement some embodiments.

Some embodiments allow information capture and/or ad conversion. Currently, QR codes are used in print advertising to take a user to a webpage. However, marketers receive little to no information about that individual visitor unless the individual follows some sort of conversion path (e.g., purchasing a product, filling out a form, etc.). Some embodiments provide marketing codes that may provide a similar user experience compared to current QR Codes, in that a user who scans one will be redirected to any desired URL. However, the user's information will be immediately captured along the way, providing a significant boost to the conversion rate of a campaign.

Some embodiments automatically populate electronic forms (and/or other types of queries) with appropriate user information when a user accesses a link (e.g., by scanning a QR code).

Some embodiments allow users to generate multiple associated QR Codes and determine whether a particular user has scanned a set of the associated codes. For instance, a retailer may host a scavenger hunt requiring contestants to scan a set of codes, where each time a code is scanned a form must be completed and submitted.

Many trade show and convention exhibitors use lead retrieval systems to capture trade show leads. Usually, event name badges include a bar code identifying each attendee and exhibitor using static information that requires expensive rental of a bar code scanner. Some embodiments allow use of, for instance, smartphones (which are ubiquitous), such that there is no need to rent a scanner or other device. Mobile applications may be provided that allow users to log into the platform, scan QR codes, search a contact list, and/or perform other appropriate actions.

Trade show events may use bar code based lead retrieval systems to put attendee contact information into a database for the exhibitor. However, the attendee is left with nothing more than various papers, cards and marketing scraps in their event bag. The lack of attendee support in current lead retrieval system make it very difficult for event attendees to take action after the event. Event attendees are the most important part of an event. Event attendees have chosen to attend an event to pursue a particular interest. The current systems only support the interests of exhibitors, leaving attendees with no system to track or organize the contacts they make at the event.

Some embodiments instantly create a two-way exchange of information, adding significant value to event attendees. By automatically providing event attendees with, for example, a contact list having the pertinent information for every person that the attendee meets at an event, including their own personal notes about the meetings, thus significantly improves the attendee experience and the value of the event for the attendees.

Over 95% of businesses in America use some sort of digital contact management system. Such contact management may require storing business card information to a database. A trade show attendee, for instance, may gather fifty to several hundred business cards in a single day of a trade show. Paper business cards require a significant amount of effort to transfer the information and notes into a database that may be used by a digital system for relationship management or marketing. Some embodiments provide information that is already digital and ready to sync with other contact management systems.

Social networks (and/or other online communication platforms) have become an incredible networking and marketing channel for businesses and consumers alike. Unfortunately, each social network is used for very different types of communication and it is very common for users to want to follow the same business on multiple social networks. A business wants users to connect with the business on as many platforms as possible. A consumer is required to go to each individual social network separately to look for and/or connect with the business. Some embodiments allow a user to add multiple social networks to a profile, making it easy for contacts to initiate connections with the user on multiple networks from one centralized location.

Businesses using social networks may successfully build a following of thousands or even hundreds of thousands of people. However, the business may be prevented from transferring those contacts into another system (e.g., for use through their own marketing channels). Some embodiments allow users to import and/or export contacts to or from a system of some embodiments (e.g., using comma separated value or "CSV" formatted data). In this way a user may easily sync a contact list provided by some embodiments with various appropriate external contact management systems.

Different embodiments may allow various types of users and/or referring affiliates. A first user type may be a site administrator that has special privileges to manipulate user (and other) data associated with the system of some embodiments. A second user type may be a person who has accessed a URL provided by the system of some embodiments but who has not yet signed up as a user. A third type of user may be signed up as a free member. A fourth type of user may be signed up and select a service option (e.g., by paying a monthly service fee) that allows the user to be considered as a first tier referring affiliate when a new user is introduced to the system through a code or link associated with the user's account. A fifth type of user may be signed up, select a service option, and also be selected by a site administrator. The fifth type of user may be considered as a first tier or second tier referring affiliate. A second tier referring affiliate may be identified when a new user is introduced to the system through a code or link of a user for whom the fifth type of user is listed as the first tier referring affiliate.

First tier referring affiliates may receive a flat rate residual monthly commission for every new user that signs up to become a fourth or fifth type of user after scanning a code or clicking a link associated with the first tier referring affiliate account. Second tier referring affiliates may receive a flat rate residual monthly commission for every new user that signs up to become a fourth or fifth type of user after scanning a code or clicking a link associated with an account for which the second tier referring affiliate account is identified as the first tier referring affiliate.

Each user account may include a member entity, a user identification (UID), a UID bar matrix code, a UID web link, a contact list, a profile URL, additional codes, additional web links, and the potential to earn referring affiliate commissions.

A UID may be a number that is generated sequentially when a user signs up for an account. These numbers may be permanently associated with the membership of the user. In some embodiments, the UID may be included in the bar matrix code, web link, and/or other user data to protect the user from other parties being able to access the user's account.

A member profile may be implemented as an entity that may be able to be acted upon. An entity may be associated with various fields (e.g., name, address, phone number, email address, etc.). A sub-entity (or "clone") may be a database object that collects information from a set of fields of a first entity and is then attached to a different entity.

The bar matrix code may be generated for each user and embedded with a profile URL and appended with a query string to trigger the execution of a data exchange script on the server. In addition to triggering the data exchange script, the destination URL for any user that Scans a bar matrix code associated with the system will be the profile URL of the entity associated with the scanned code.

A UID web link is a web link that is created for each user and may include the member profile URL and be appended with a query string to trigger the execution of a data exchange script on the server. In addition to triggering the data exchange script, the destination URL for any user that clicks a UID web link may be the profile URL of the entity associated with the scanned code.

A marketing link may be provided using an additional matrix bar code. Such a marketing code may be associated with a $3^{rd}$-party URL (e.g., an existing site associated with a particular entity). Thus, the destination URL for any user that scans a marketing code will be the URL is designated as the destination by the user entity. The destination URL may be accessed by first navigating to a system URL that executes a script and re-directs the user to the destination URL. Alternatively, the destination URL may be directly embedded in the marketing code and cause the user to navigate directly to the destination site.

An additional web link may have a destination URL that is designated by the user entity. A profile URL may be a web address that is specific to each user and displays publicly-accessible entity fields.

A scan may involve interactions among the camera of a user device (and/or other appropriate device elements such as a storage, a user interface element, etc.) and a UID code (e.g., a bar matrix code such as a QR code).

A query string may be a component of a web link that includes data (e.g., user information, code information, etc.) to be passed to a server-side application.

A script may be any program that may be executed by the server and may accept information passed from the query string (and/or other sources) and may execute one or more sets of instructions according to various sets of parameters, as appropriate.

Data exchange settings may be used by a security feature that may allow members to either allow "automatic" approval of any entity field exchange or to select "approval required" before allowing at least one entity field to be exchanged. A user may select various other exchange settings, as appropriate (e.g., automatically share with contacts but require approval for new connections, automatically share with users associated with a particular entity (e.g., a system entity and/or an external entity such as a business, club, etc.), approval based on source (e.g., users who scan a first code may automatically receive information, while users who scan a second, additional, code, may not receive private information without approval, users directed from a different web sites may have different approval levels applied, etc.)

The first tier referring affiliate may be a designation that is only available to the fourth and fifth user types. If a new user accesses the site through a code or web link associated with a fourth or fifth type account, then the entity associated with the scanned code or selected web link may become the first tier referring affiliate associated with the new account.

The second tier referring affiliate may be a designation that is only available to the fifth user type. If a new user accesses the site through a code or web link associated with a fifth user type account, then the entity that is listed as the first tier referring affiliate for the entity associated with the scanned code or selected web link becomes the second tier referring affiliate.

A contact list may be an exportable database of sub-entities attached to an entity that may be exported by the user associated with the entity, as appropriate.

A. System

FIG. 1 illustrates a schematic block diagram of a conceptual system 100 according to an exemplary embodiment the invention. Specifically, this figure shows the data pathways available among the various elements of the system. As shown, the system 100 may include at least one graphic data element 110, at least one user device 120, one or more networks 130, and a set of servers 140.

The graphic data element 110 may be adapted to provide, for example, an exchange code or marketing code and may be represented as a matrix bar code in some embodiments. The graphic data element may be provided in various forms (e.g., as printed media such as a business card, badge or flyer, as a digital picture that is able to be displayed on an appropriate device such as a smartphone or tablet, etc.).

Each user device 120 may be a device that is capable of connecting to one or more networks and that may provide a user interface that may allow a user to receive information from the device and/or provide information to the device. In addition, each user device may be able to execute various instructions, store and/or retrieve data, and/or perform various other appropriate functions.

The network 130 may include one or more networks. Such networks may be wireless, hardwired, or otherwise appropriately connected. Each network may include various sub-networks and/or be able to communicate among various other networks. Examples of such networks include cellular communication networks, local area networks, wireless networks, the Internet, Ethernet networks, etc.

The server 140 may be a set of one or more devices that is able to connect to a network, execute various sets of instructions, and/or store or retrieve data. In some embodiments, the server may be able to access various storages (not shown), either locally or through a network resource.

During operation, a graphic data element 110 may be available to one or more users for scanning. A user device 120 may then scan the element 110, which may direct an application running on the user device 120 (e.g., a web browser) to access a URL associated with the graphic data element 110. Access of the URL may be detected by the server 140, which may be running an application adapted to provide various functionality of the system 100. The server 140 may then determine, based on a user associated with the graphic data element 110 and a user associated with the scanning device 120, the information that should be provided to each user (e.g., full contact information, partial contact information, basic contact information, no information, etc.). The appropriate information may then be retrieved from an appropriate storage and formatted for delivery to the appropriate user through a user device 120 associated with the user. Such information may be sent from the server 140, through the networks 130, to the appropriate user device(s) 120.

One of ordinary skill in the art will recognize that the system 100 may be implemented in various different ways without departing from the spirit of the invention. For instance, different individual elements may be included, multiple elements may be combined into a single element, a single element may be divided into multiple sub-elements, etc. As another example, various different communication pathways may be present in some embodiments.

B. Method

Figure 2:
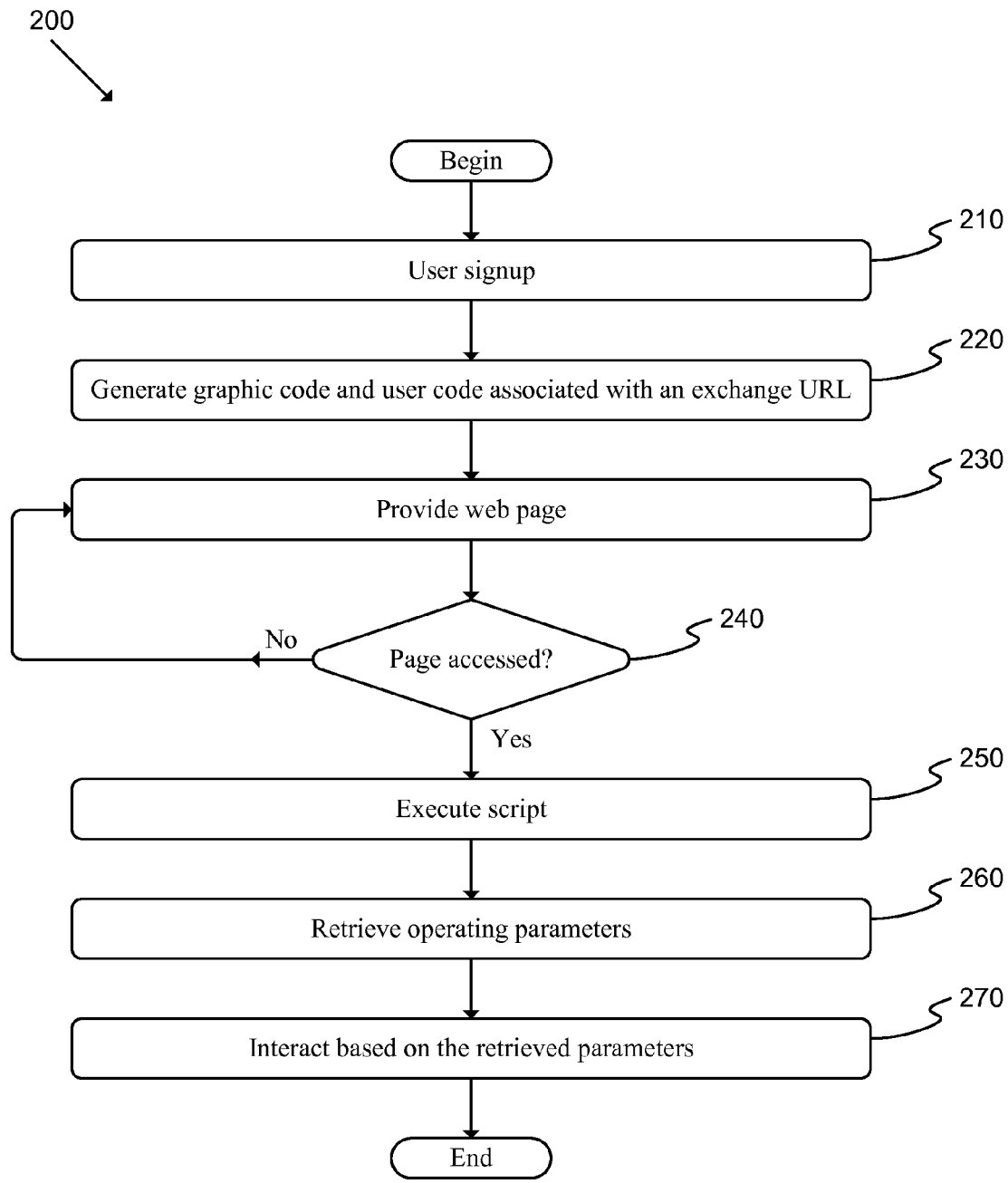
FIG. 2 illustrates a flow chart of a conceptual process used by some embodiments to transfer data.

FIG. 2 illustrates a flow chart of a conceptual process 200 used by some embodiments to transfer data. Such a process may be implemented using a system such as system 100 described above in reference to FIG. 1.

Process 200 may begin, for instance, when a user executes an application, when a user accesses a web site, when a user scans a matrix bar code, and/or under other appropriate circumstances. Next, the process may perform (at 210) a user signup. Such a signup may be performed if a new user accesses the system. The signup may include providing queries to the user and receiving information back from the user (e.g., contact information, privacy preferences, etc.). Alternatively to the signup operation, a user may update the information associated with the user.

The process may then generate (at 220) a graphic code and user code associated with an exchange URL. In some embodiments, the user code may include concatenated user information fields (e.g., first name, last name, etc.) and may also include a randomly assigned user ID (e.g., a string of randomly generated digits). The URL may be determined at least partly based on the user code (e.g., the URL may include at least a portion of the user code). The graphic code may include a visual representation of the URL.

Next, the process may provide (at 230) a web page associated with the exchange URL. Such a web page may be dynamically generated and hosted by an appropriate server (and/or other appropriate resources).

Process 200 may then determine (at 240) whether the web page has been accessed. Such a determination may be made in various appropriate ways (e.g., the server hosting the web page may notify a system of some embodiments that the page has been accessed). If the process determines (at 240) that the web page has not been accessed, the process may continuously perform operation 240 until the process determines (at 240) that the page has been accessed.

The process may then execute (at 250) a script associated with the web page. Next, the process may retrieve (at 260) various operating parameters (e.g., user contact information, privacy settings, etc.). Such operating parameters may be retrieved from a server, a user device, and/or other appropriate sources. Next, the process may interact (at 270) based on the retrieved parameters. Such interaction may include, for instance, providing contact information to one or more users.

One of ordinary skill in the art will recognize that process 200 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

II. System

Sub-section II.A provides a conceptual description of the hardware architecture used by some systems. Sub-section II.B then describes a conceptual software architecture used by some systems. Next, sub-section II.C describes a client-side application of some embodiments. Sub-section II.D then describes a server-side application of some embodiments. Next, sub-section II.E describes various conceptual data structures used by some embodiments. Lastly, sub-section II.F describes a conceptual set of messages used to exchange information.

Although example systems and components described below may refer to hardware and/or software elements, one of ordinary skill in the art will recognize that the features of some embodiments may be implemented using various combinations of hardware, software, and mixed-mode elements, as appropriate.

A. Hardware Architecture

Figure 3:
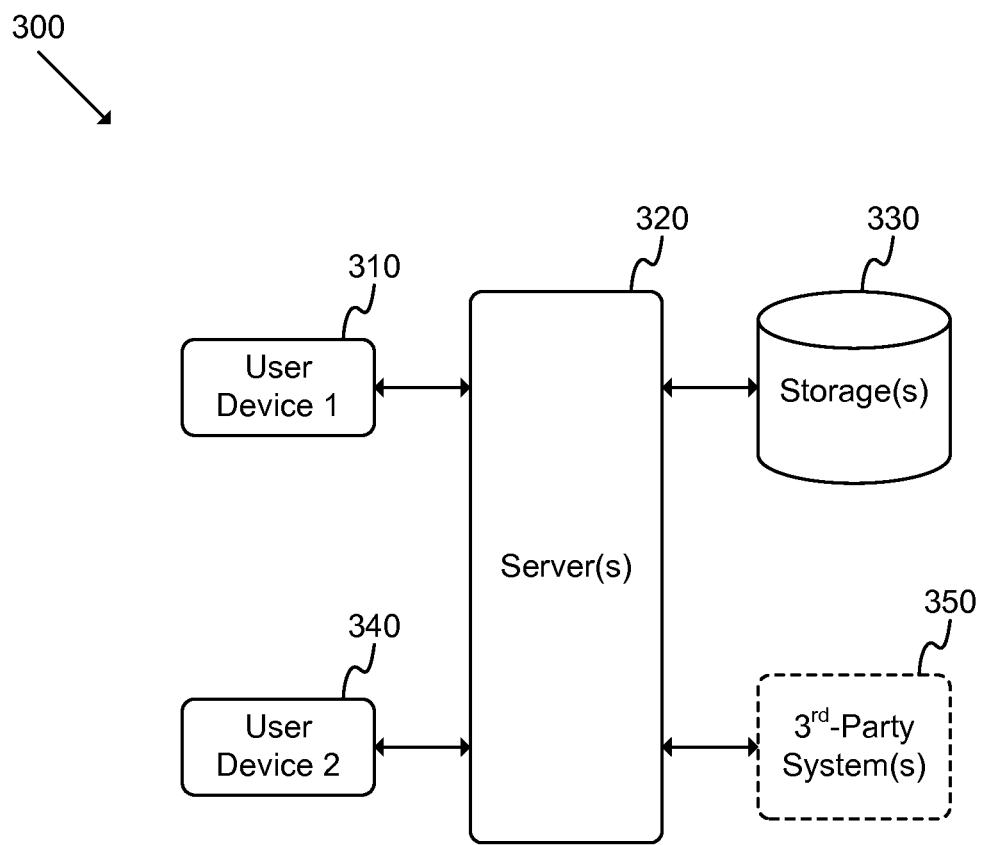
FIG. 3 illustrates a schematic block diagram of a conceptual system of some embodiments.

FIG. 3 illustrates a schematic block diagram of a conceptual system 300 of some embodiments. Specifically, this figure shows an example configuration that may be used to exchange data among two users. As shown, the system may include a first user device 310 associated with a first user, one or more servers 320, one or more storages 330, a second user device 340, and one or more $3^{rd}$-party systems 350.

The first user device 310 may be any appropriate user device (e.g., a smartphone, tablet device, etc.) that is able to communicate with the server 320. The server may be any appropriate computing device that is able to execute instructions, store and retrieve data, and/or communicate among other devices. The storages 330 may be accessible to the server and may be capable of storing data and/or instructions. The second user device 340 may be any appropriate user device (e.g., a smartphone, tablet device, etc.) that is able to communicate with the server 320. Each $3^{rd}$-party system 350 may include various sets of devices that are capable of communicating with the server 320. In some embodiments, the $3^{rd}$-party systems may access the server 320 (and/or directly access the storages 330) using one or more application programming interfaces ("APIs").

During operation, the first user device 310 may be associated with a first user, and may execute an application of some embodiments and scan a code associated with a second user (e.g., an exchange code associated with the second user). Scanning the code may cause the application running on the device 310 to access the server 320 (e.g., through a URL provided by scanning the code). The server may identify the first user based on information received from the application running on device 310. The server 320 may identify the second user based on the URL. The server may access the storages 330 in order to retrieve information related to each of the users. The server 320 may then send contact information associated with the first user to the second user device 340, which may be associated with the second user. If the second user device is unavailable or not executing an appropriate application, the contact information may be held in a queue until the second user connects the device to an appropriate network or otherwise enables the transfer of data (e.g., by launching an application provided by some embodiments). Depending on various retrieved settings associated with the second user, the server 320 may then send contact information associated with the second user to the first user device 310.

One of ordinary skill in the art will recognize that the system 300 may be implemented in various different ways without departing from the spirit of the invention. For instance, different individual elements may be included, multiple elements may be combined into a single element, a single element may be divided into multiple sub-elements, etc. As another example, various different communication pathways may be present in some embodiments.

B. Software Architecture

Figure 4:
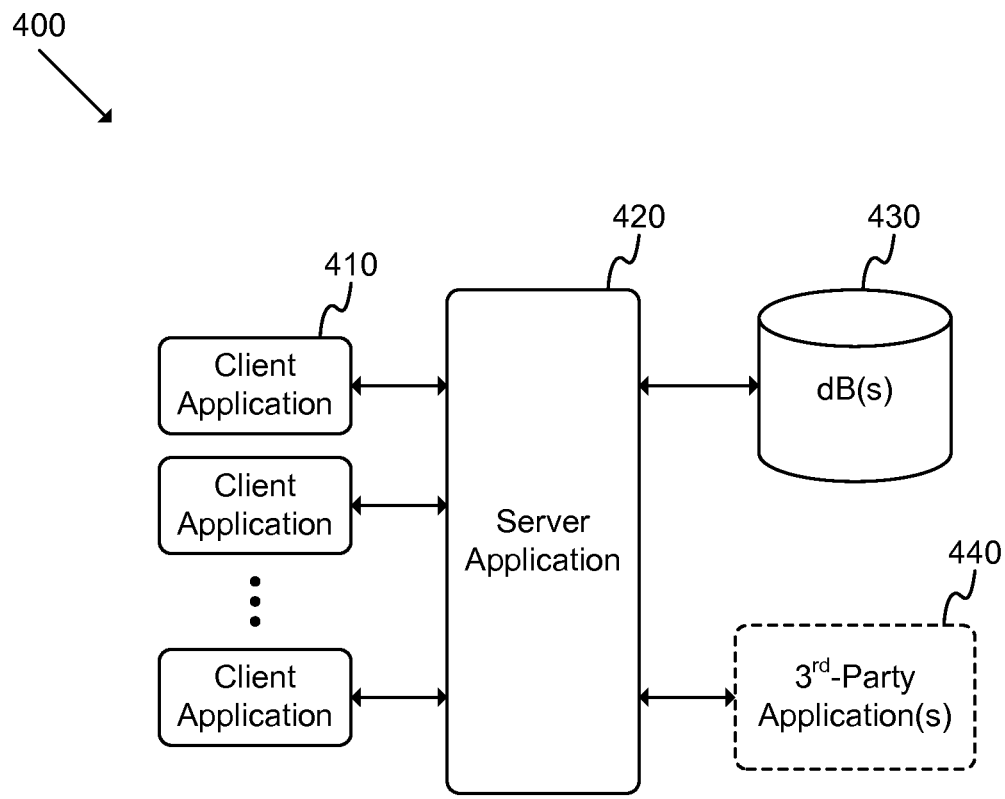
FIG. 4 illustrates a schematic block diagram of a conceptual software system of some embodiments.

FIG. 4 illustrates a schematic block diagram of a conceptual software system 400 of some embodiments. Specifically, this figure shows various software modules that may allow a system (e.g., system 300) to operate in some embodiments. As shown, system 400 may include at least one client application 410, a server application 420, one or more databases 430, and one or more $3^{rd}$-party applications 440.

Each client application 410 may be an application that is able to be executed by a client device that may be associated with a user (e.g., a smartphone app, PC software, etc.). The client application will be described in more detail in reference to FIG. 5 below.

The server application 420 may be able to be executed by a set of server devices. The server application will be described in more detail in reference to FIG. 6 below.

The databases 430 may include various sets of data and/or instructions that may be accessible to the server application 420. Such databases 430 may be stored using an appropriate set of storages. Some conceptual data structures will be described in more detail in reference to FIG. 7 below.

Each $3^{rd}$-party application 440 may be able to be executed on a $3^{rd}$-party device and may be able to access the server application 420 (and/or other system elements via the server application).

During operation, a client application 410 may be launched before scanning a code. The client application may send the code information and/or information regarding a user associated with the client application to the server application 420. The server application may retrieve data from the dBs 430 related to the scanning user and the user associated with the code. Depending on various user settings, preferences, etc., portions of the retrieved data may be sent to the client application 410 associated with the scanning user and/or a client application 410 associated with the user associated with the code.

One of ordinary skill in the art will recognize that system 400 is conceptual in nature and may be implemented in various different ways without departing from the spirit of the invention. For instance, different individual elements may be included, multiple elements may be combined into a single element, a single element may be divided into multiple sub-elements, etc. As another example, various different communication pathways may be present in some embodiments.

C. Client Application

Figure 5:
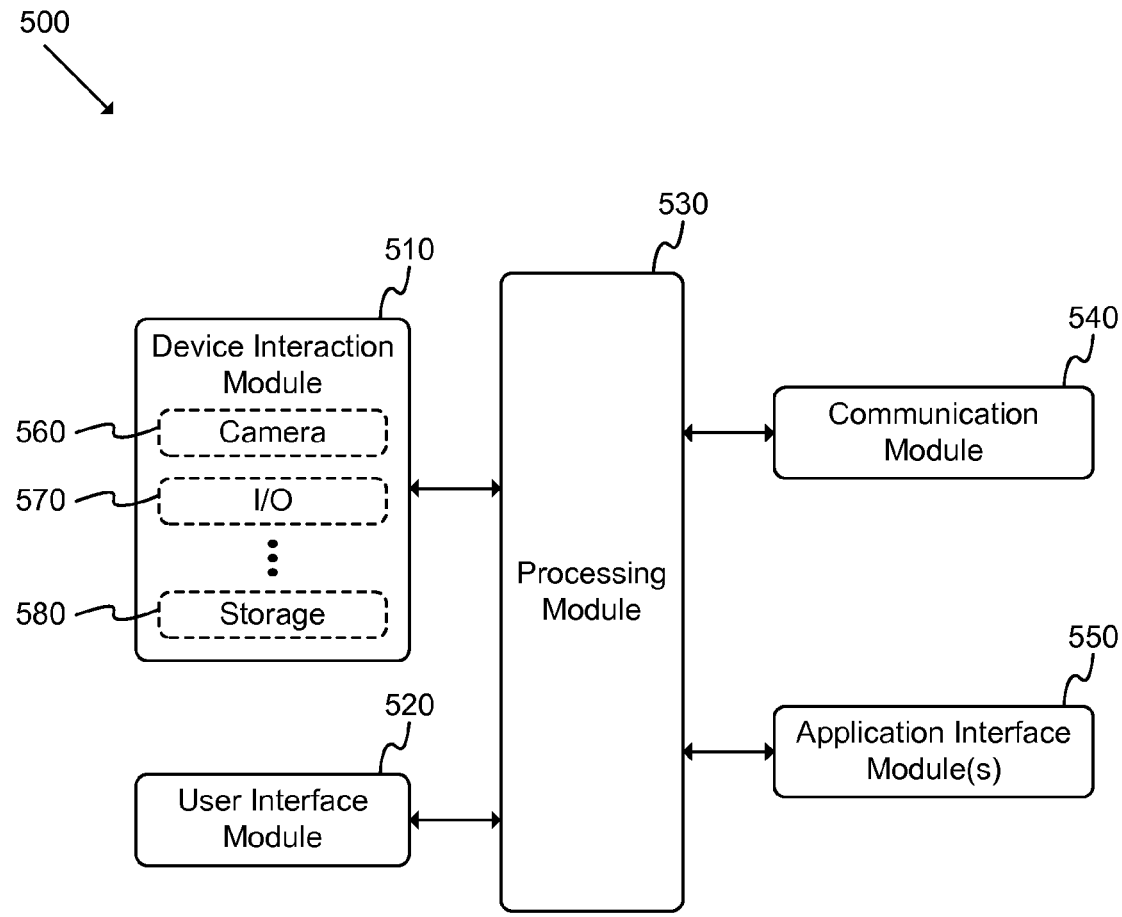
FIG. 5 illustrates a schematic block diagram of a client-side application of some embodiments.

FIG. 5 illustrates a schematic block diagram of a client-side application 500 of some embodiments. Specifically, this figure shows the various modules that may be used by the client-side application to interact with and/or control a user device in order to interact with the system of some embodiments. As shown, the client-side application may include a device interaction module 510, a user interface ("UI") module 520, a processing module 530, a communication module 540, and at least one application interface module 550.

The device interaction module 510 may allow the application 500 to interact with various hardware and/or software components of a user device. As shown, the device interaction module 510 may include, for example, camera 560, input/output 570, storage 580, and/or other sub-modules. The camera sub-module 560 may allow the application 500 to control the operation of a camera associated with the user device and receive image data from the camera (e.g., when a user scans a code). The input/output sub-module 570 may allow the application 500 to receive inputs from, for example, a device keyboard, mouse, and/or touch screen, and send outputs to a display (e.g., when a user enters contact information, selects privacy settings, etc.).

The storage sub-module 580 may allow the application 500 to store and/or retrieve data from various storages accessible to the user device. In some embodiments, the storage sub-module 580 may be able to access data that identifies the user associated with a device executing the client application. Such identifying data may be stored in the form of a "cookie", and/or various other appropriate ways.

The UI module 520 may be able to generate various outputs to and/or receive various inputs from a user of the user device. For instance, the UI module may generate various queries, forms, and/or other elements for receiving contact information from a user and receive and format the responses for processing. Such elements may be optimized depending on the types of device and/or display available.

The processing module 530 may execute various instructions and/or process data. In addition, the processing module may allow communication among the other elements of the application 500.

The communication module 540 may allow communication among external systems, devices, etc. For instance, the communication module may include a resource for accessing the Internet, a resource for accessing a cellular network, a resource for accessing a local storage, etc. In addition, the communication module may be specifically adapted to interact with a similar module of server-side application associated with the client-side application (e.g., the server-side application described below in reference to FIG. 6).

Each application interface module 550 may be able to communicate among one or more third-party applications. The application interface module may include various APIs, as appropriate.

Client application 500 may be implemented using various combinations of stand-alone software provided by the system of some embodiments, a combination of system software and web browsing software, or may be completely implemented using a web browser.

One of ordinary skill in the art will recognize that application 500 is conceptual in nature and may be implemented in various different ways without departing from the spirit of the invention. For instance, different individual elements may be included, multiple elements may be combined into a single element, a single element may be divided into multiple sub-elements, etc. As another example, various different communication pathways may be present in some embodiments.

D. Server Application

Figure 6:
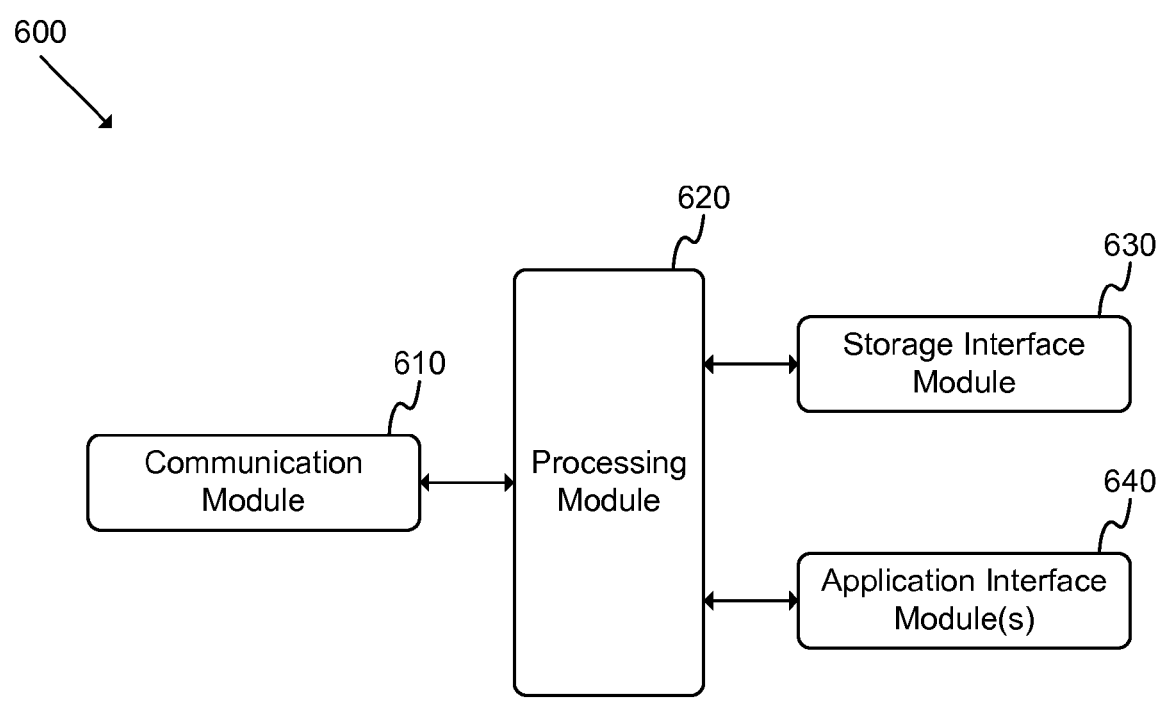
FIG. 6 illustrates a schematic block diagram of a server-side application of some embodiments.

FIG. 6 illustrates a schematic block diagram of a server-side application 600 of some embodiments. Specifically, this figure shows the various modules that may be used by the server-side application to interact with various system elements of some embodiments. As shown, the server-side application may include a communication module 610, a processing module 620, a storage interface module 630, and one or more application interface modules 640.

The communication module 610 may allow communication among external systems, devices, etc. For instance, the communication module may include a resource for accessing the Internet, a resource for accessing a cellular network, a resource for accessing a local storage, etc. In addition, the communication module may be specifically adapted to interact with a similar module of client-side application associated with the server-side application (e.g., client-side application 500).

The processing module 620 may execute various instructions and/or process data. In addition, the processing module may allow communication among the other elements of the application 600. In some embodiments, the processing module 620 may execute a script that is able to interact with various other system elements. Each such script may be associated with a particular URL and may be stored in a storage accessible to the processing module 620.

The storage interface module 630 may allow the application 600 to store and/or retrieve data from various storages accessible to the servers of some embodiments. Such storages may be local or may be accessed over one or more networks.

Each application interface module 640 may be able to communicate among one or more third-party applications. The application interface module may include various APIs, as appropriate. The application interface module may also facilitate $3^{rd}$-party access to the storage interface module 630, and thus the associated storages, as appropriate.

One of ordinary skill in the art will recognize that application 600 is conceptual in nature and may be implemented in various different ways without departing from the spirit of the invention. For instance, different individual elements may be included, multiple elements may be combined into a single element, a single element may be divided into multiple sub-elements, etc. As another example, various different communication pathways may be present in some embodiments.

E. Data Structures

Figure 7:
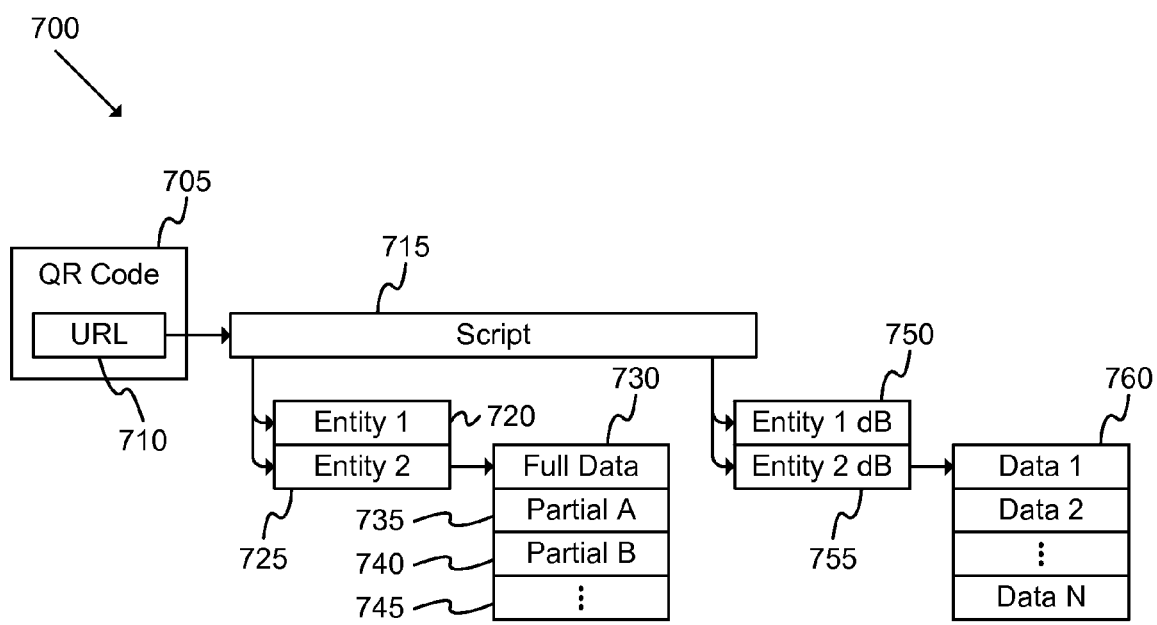
FIG. 7 illustrates a data structure diagram representing conceptual data structures used by some embodiments.

FIG. 7 illustrates a data structure diagram 700 representing conceptual data structures used by some embodiments. Specifically, this figure shows various references and/or data elements that may either be accessible to and/or included in other data elements. As shown, the data structures include a QR code 705 (or other bar matrix code) having a URL sub-element 710, a script 715 that refers to first and second entities 720-725, each entity referring to a full data element 730, a partial data element 735, a second partial data element 740, and/or other data elements 745. In addition, the script 715 may refer to first and second entity databases 750-755, each of which may refer to a set of sub-elements 760.

The graphic code 705 may be a bar matrix code, bar code, etc. The URL 710 may include an exchange URL, a marketing link, and/or other appropriate element.

The script 715 may be referenced by the URL 710 and may be automatically executed whenever the URL is accessed.

Each entity 720-#725 may be associated with a user, organization, etc. The full data 730 may include all available data associated with the user (e.g., all contact information), the partial data A element 735 may include data associated with a limited amount of user information (e.g., picture, name, and company). The partial data B element 740 may include data associated with other user information (e.g., work contact information, but not personal contact information).

Each entity dB 750-755 may be associated with an entity (e.g., entity 720 or 725) and may include multiple sub-elements 760. In some embodiments, each sub-element is a clone (or partial clone) of data associated with a different entity (e.g., contact information or partial contact information related to a different entity).

One of ordinary skill in the art will recognize that the structures described above in reference to FIG. 7 are conceptual in nature and different embodiments may be implemented in various different ways without departing from the spirit of the invention. For instance, each element may have different numbers of sub-elements, references, etc. As another example, various potential references among elements have been eliminated for clarity. For instance, each entity may refer to an entity database, rather than the entity database being directly accessed by a script.

F. Message Flow

Figure 8:
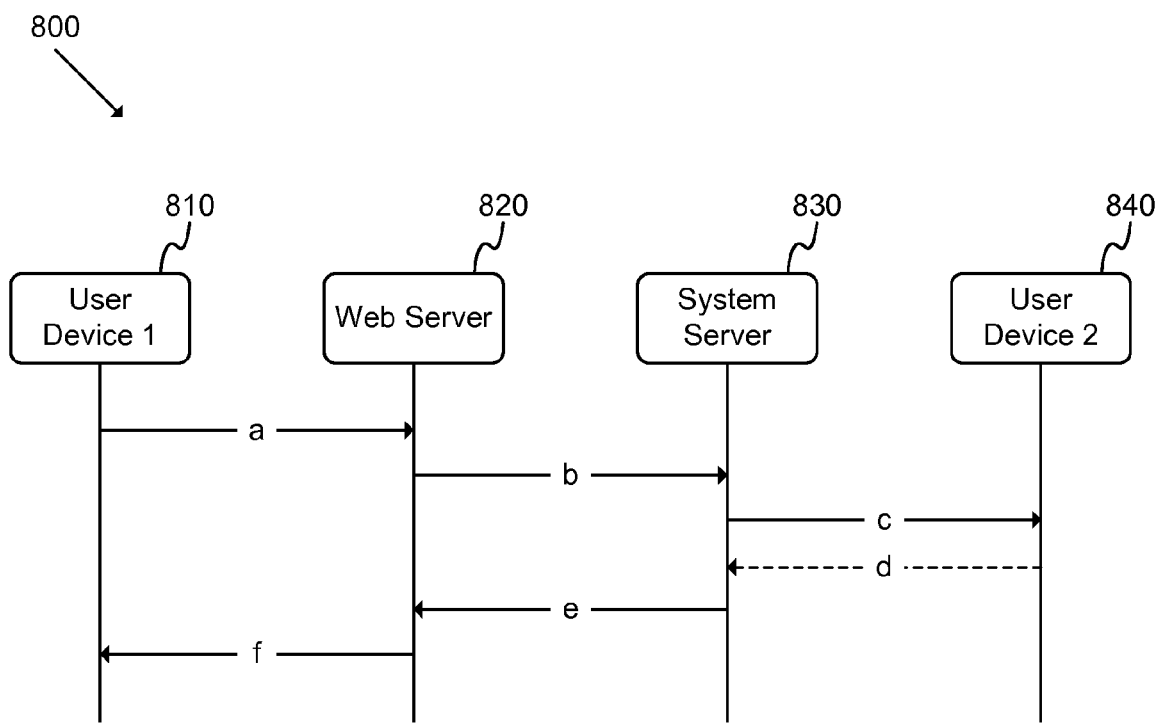
FIG. 8 illustrates a message flow diagram representing a conceptual information flow of some embodiments.

FIG. 8 illustrates a message flow diagram representing a conceptual information flow 800 of some embodiments. Specifically, this figure shows the flow of information among system elements in one example usage scenario. As shown, the communication occurs among a first user device 810 associated with a first user, a web server 820, a system server 830, and a second user device 840.

Such a message flow may begin, for instance, after a user has launched a client-side application of some embodiments and scanned a code provided by some embodiments. The user device 810 may send a message 'a' to the web server. In some embodiments, the "message" may simply include a request to access a URL. The web server 820 may receive message 'a' and send message 'b' to the system server 830. Message 'b' may include information that indicates the identity of each user or entity (the scanning user, and the user associated with the scanned code). The system server 830 may receive message 'b' and generate and send message 'c' to the second user device 840. Message 'c' may include contact information associated with the first user, for instance.

In some embodiments, message 'c' may include a confirmation request (e.g., the second user may be asked what level of information to share with the first user). Thus, the second user device 840 may send message 'd' back to the system server 830, where message 'd' may include responses to any queries generated relative to message 'c'.

Whether based on a response included in message 'd' or otherwise determined (e.g., based on previously-stored user preferences), the system server 830 may generate and send message 'e' to the web server 820. The web server may, in response, send message 'f' to the first user device 810, where messages 'e' and 'f' may include information related to the second user (e.g., some level of contact information).

One of ordinary skill in the art will recognize that the message flow 800 is conceptual in nature and may be implemented in various different ways without departing from the spirit of the invention. For instance, although each message is shown as a single communication, various messages may be sent as multiple packets of information. As another example, although the messages are shown as uni-directional communications, some embodiments may include communication methodologies where a partial message is sent from a first element to a second element before a confirmation is received at the first element from the second element and another partial message may be sent, etc.

III. Methods of Operation

Sub-section III.A provides a conceptual description of processes used to set up a new user. Sub-section III.B then describes various ways of generating exchange URLs. Next, sub-section III.C describes generation of graphic codes. Sub-section III.D then describes data exchange facilitated by accessing an exchange URL. Lastly, sub-section ME describes information sharing among users.

During an exemplary user interaction sequence, some embodiments may first determine whether a first user has already created an account. If the first user is not associated with an existing account, the first user may be directed to a new member homepage. Alternatively, if a first user is associated with an existing account, a set of sub-entities in the first user's (and/or entity's) contact list may be exported to a second user (and/or entity) associated with a code scanned by the first user.

A query string associated with a scanned code or clicked web link may trigger a script that may generate a sub-entity using a set of fields associated with the first user. Such a set of fields may be used to interact, alternatively and/or conjunctively, with various web-based forms that may require a user to input one or more fields (e.g., name, address, etc.).

Some embodiments may generate a sub-entity of including various fields associated with the first user. The sub-entity may then be attached (and/or otherwise associated) to the second user.

Some embodiments may determine a web link (e.g., a UID web link, an additional web link, etc.) associated with a scanned code and automatically navigate a user to the link associated with the scanned code.

Some embodiments may determine the level of sharing designated by the second user and proceed accordingly. Some embodiments may generate a sub-entity that includes a sub-set of approved fields to share with another user. Different sets of fields may be shared depending on the level of sharing (e.g., all fields may be shared when "automatic" has been selected, a sub-set of fields may be shared when "approval required" has been selected, and another sub-set of fields may be shared when a conditional approval has been granted to member of a group or other appropriate associate, etc.). In some embodiments, an exchange script may be automatically executed based at least partly on the designated level of sharing.

A sub-entity may be created and attached to (and/or otherwise associated with) another entity. In some embodiments, multiple sub-entities may be created (and/or attached to other entities). For example, a first sub-entity may be shared at first access and a second sub-entity may be shared upon approval (and/or other appropriate confirmation).

If a user denies a request, the request may be deleted and no further action may be taken.

During sign up, each user may be assigned a user type, which may be at least partly based on selections made by the user.

Some embodiments may determine if a user accessed the system through a first or second type affiliate, and associate the user with the affiliate(s) as appropriate. In some embodiments, if the user us not associated with any member affiliates, a default referring affiliate may be designated (e.g., a salesman, executive, and/or other appropriate party associated with a system of some embodiments).

The processes described below may be implemented using various combinations of devices and or systems (e.g., the systems, and associated devices, described above in reference to FIGS. 1, 3, and/or 4). In addition, the processes may be implemented using various software entities (e.g., the applications described above in reference to FIGS. 5-6.

A. User Setup

Figure 9:
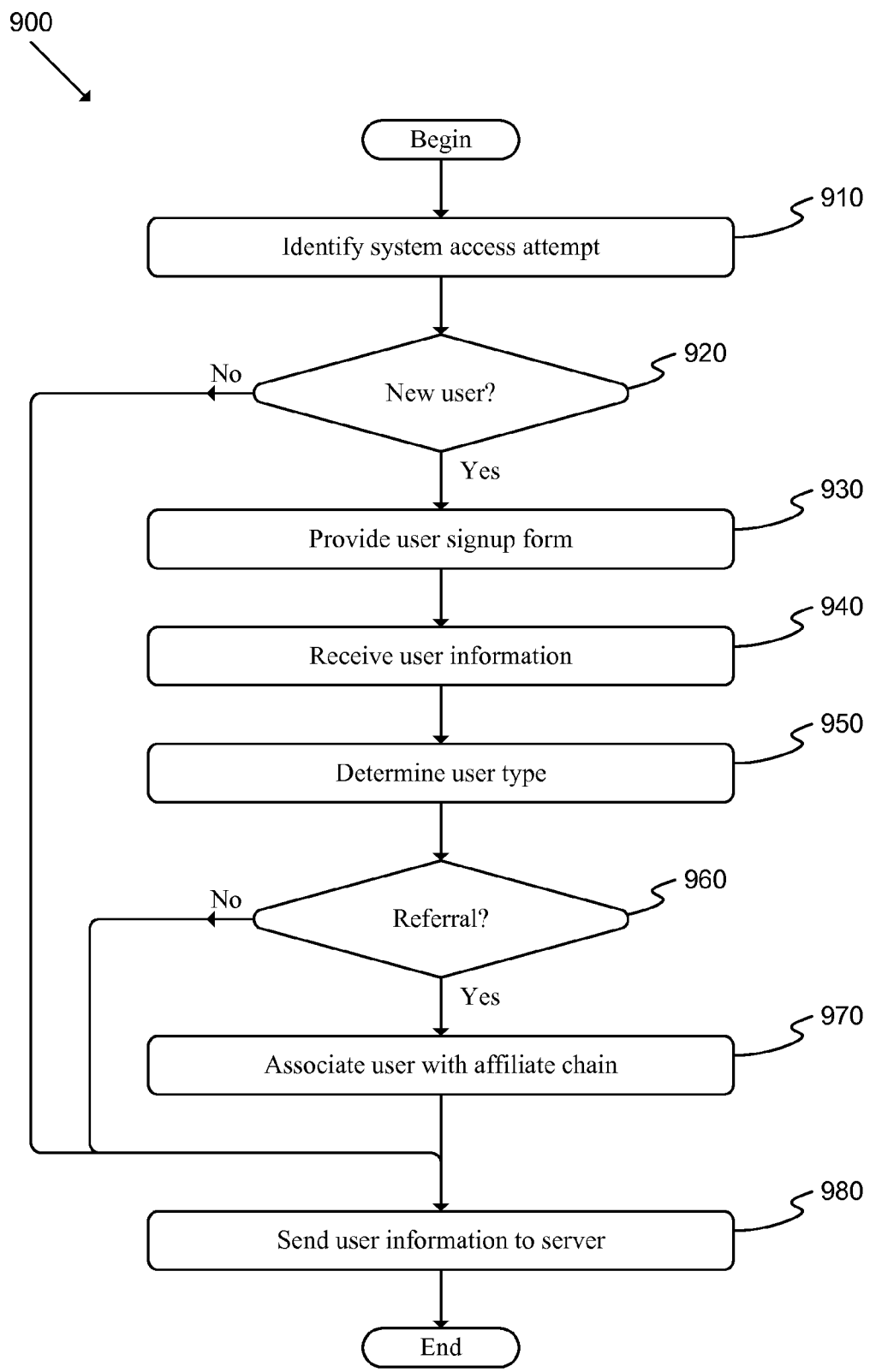
FIG. 9 illustrates a flow chart of a conceptual client-side process used by some embodiments to setup a user account.

FIG. 9 illustrates a flow chart of a conceptual client-side process 900 used by some embodiments to setup a user account. Such a process may begin, for instance, when a device user scans a code or accesses a web link provided by some embodiments and the process determines that the user is not associated with the system (e.g., by determining that no cookie is available on the user device associated with the system of some embodiments).

Next, the process may identify (at 910) a system access attempt (e.g., by determining that a user or potential user has navigated to a system-provided web link). The process may then determine (at 920) whether the user is a new user (i.e., whether the user has an existing account). If the process determines that the user is not a new user, the process may continue to operation 980 described below. If the process determines that the user is a new user, the process may provide (at 930) a user signup form. Such a signup form may include various appropriate fields (e.g., name, address, email, etc.) that may be required, or not, as appropriate.

The process may then receive (at 940) user information and determine (at 950) a user type for the user. Next, the process may determine (at 960) whether the user is a referral. If the process determines that the user is not a referral, the process may continue to operation 980. Otherwise, the process may associate (at 970) the user with the affiliate chain (e.g., a first and/or second tier affiliate).

One of ordinary skill in the art will recognize that process 900 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

Figure 10:
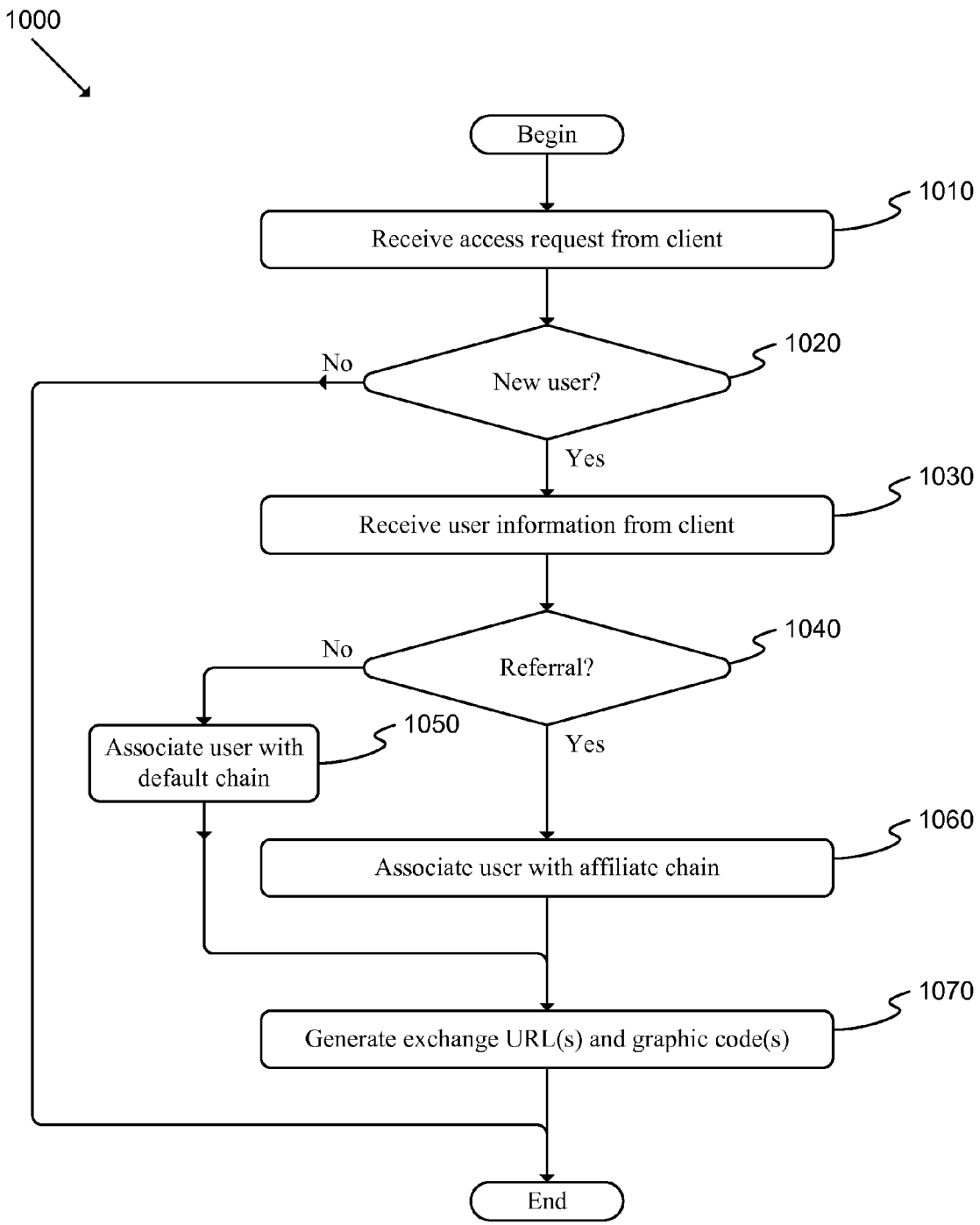
FIG. 10 illustrates a flow chart of a conceptual server-side process used by some embodiments to setup a user account.

FIG. 10 illustrates a flow chart of a conceptual server-side process 1000 used by some embodiments to setup a user account. Such a process may begin, for instance, when a user launches a client application of some embodiments, and/or at other appropriate times.

Next, the process may receive (at 1010) an access request from a client. Next, the process may determine (at 1020) whether the request has been received from a new user (e.g., by determining whether a cookie associated with some embodiments is available at the user device used by the new user to access the system of some embodiments). If the process determines that the request has been received from an existing user, the process may end. Otherwise, the process may next receive (at 1030) user information from a client application of some embodiments. The user information may include fields such as name, address, etc.

The process may then determine (at 1040) whether the user is a referral. The determination may be made in various appropriate ways (e.g., by determining the path followed by the user to the system, by receiving an indication from the user, etc.).

If the process determines that the user is not a referral the process may associate (at 1050) the user with a default referral chain (e.g., a default user may be assigned as the referring user). Alternatively, the process may associate (at 1060) the user with an affiliate chain including one or more referring affiliates.

After associating (at 1050) the user with a default chain or associating (at 1060) the user with a dynamic affiliate chain, the process may generate (at 1070) exchange URL(s), graphic code(s), and/or other appropriate elements associated with the user, as appropriate.

After generating (at 1070) URLs and/or codes, or after determining (at 1020) that the user is not a new user, the process may end.

One of ordinary skill in the art will recognize that process 1000 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

B. Generation of Exchange URLs

Figure 11:
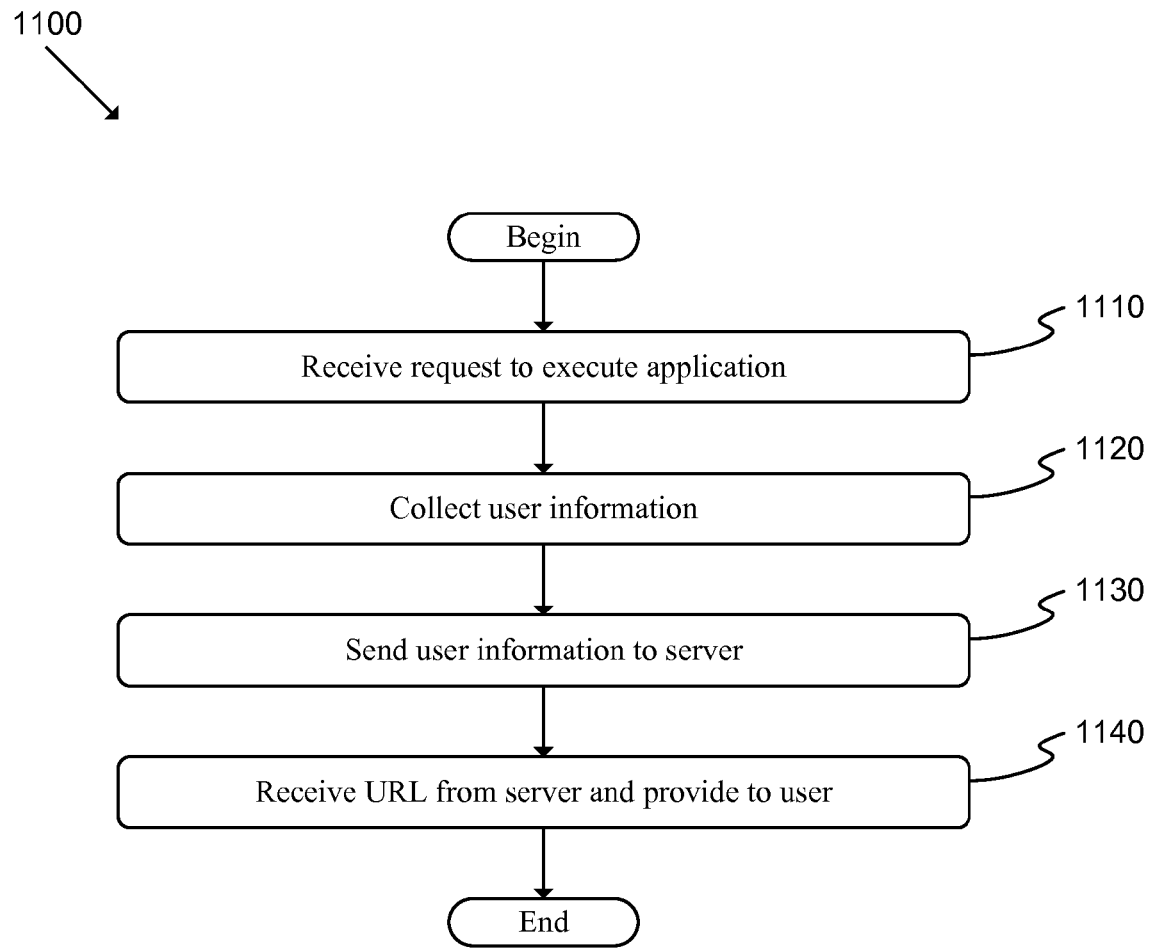
FIG. 11 illustrates a flow chart of a conceptual client-side process used by some embodiments to generate a set of exchange URLs associated with a user.

FIG. 11 illustrates a flow chart of a conceptual client-side process 1100 used by some embodiments to generate a set of exchange URLs associated with a user. Such a process may begin when, for example, a user launches a client application of some embodiments, a user accesses a web link, etc.

As shown, the process may receive (at 1110) a request to execute an application. Such a request may be received in various appropriate ways (e.g., a user may launch a client application, a user may scan a code, etc.). Next, the process may collect (at 1120) user information (e.g., user name, address, etc.). The process may then send (at 1130) the collected information to a server and then receive (at 1140) a URL from the server and provide the URL to the user. Such a URL may be based on various appropriate factors and/or elements (e.g., the URL may include a user's first name, last name, UID, etc., as a concatenated string).

One of ordinary skill in the art will recognize that process 1100 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

Figure 12:
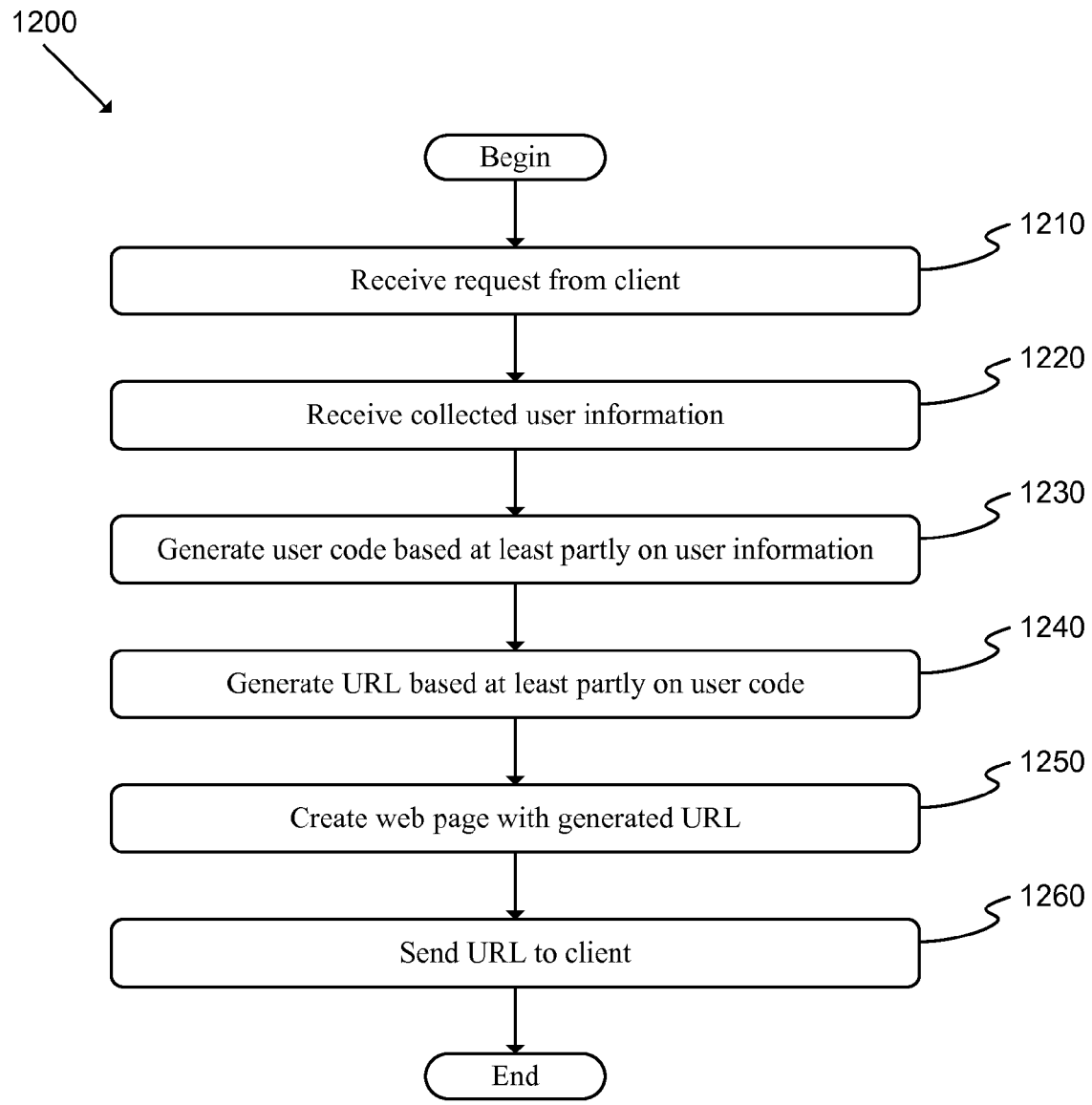
FIG. 12 illustrates a flow chart of a conceptual server-side process used by some embodiments to generate a set of exchange URLs associated with a user.

FIG. 12 illustrates a flow chart of a conceptual server-side process 1200 used by some embodiments to generate a set of exchange URLs associated with a user. Such a process may begin when, for example, a user accesses a server of some embodiments (e.g., using client application 500).

As shown, the process may receive (at 1210) a request from a client application. Such a request may be received in various appropriate ways (e.g., a user may access a system web site, a user may launch a client application, etc.).

Next, the process may receive (at 1220), from the client application, collected user information (e.g., user name, address, etc.). The process may then generate (at 1230) a user code (e.g., a UID) based at least partly on the received user information. Next, the process may generate (at 1240) a URL based at least partly on the user code. Such a URL may be based on various appropriate factors and/or elements (e.g., the URL may include a user's first name, last name, UID, etc., as a concatenated string).

Process 1200 may then create (at 1250) a web page using the generated URL (i.e., a page may be defined and then associated with the generated URL, such that the page is accessible to any web-capable device). The process may then send (at 1260) the URL to the client application and/or otherwise make the URL known to the user (e.g., by sending an email, text message, etc.) and then end. In addition, the process may store the URL to a storage accessible to the server.

One of ordinary skill in the art will recognize that process 1200 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

C. Generation of Graphic Codes

Figure 13:
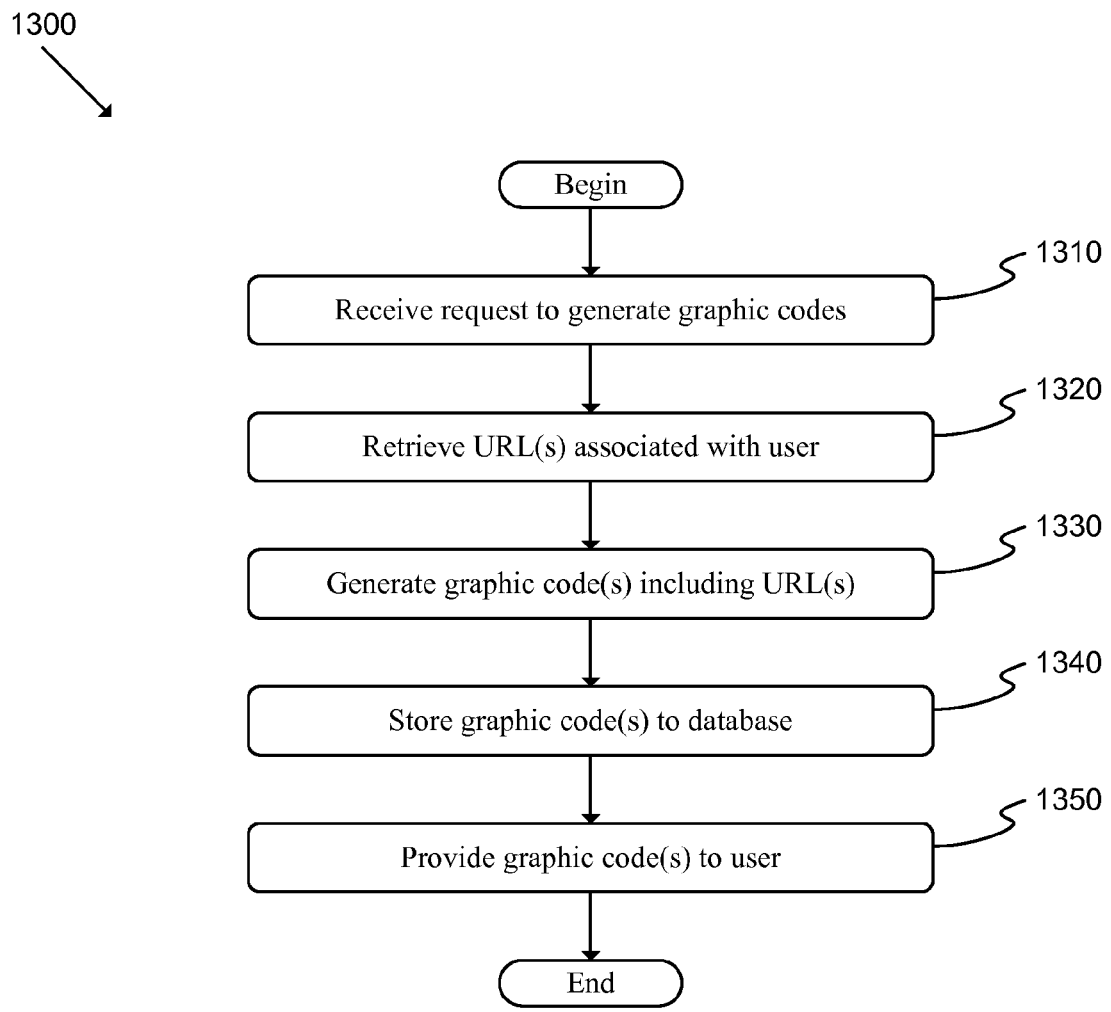
FIG. 13 illustrates a flow chart of a conceptual process used by some embodiments to generate a set of graphic codes associated with a user.

FIG. 13 illustrates a flow chart of a conceptual process 1300 used by some embodiments to generate a set of graphic codes associated with a user. Such a process may begin, for instance, after an exchange URL has been generated.

As shown, the process may receive (at 1310) a request to generate one or more graphic codes. Such a request may be received in various appropriate ways (e.g., from a user through a client application, as an internal command after an exchange URL has been generated, etc.). The request may include information such as a user identity, type of URL (exchange, marketing, etc.), etc.

Next, the process may retrieve (at 1320) one or more URLs associated with the user. The URLs may be retrieved from an appropriate storage element. Process 1300 may then generate (at 1330) one or more graphic codes (e.g., a matrix bar code), each including an embedded URL associated with the user. Next, the process may store (at 1340) the generated graphic code(s) to a database or other appropriate storage. The process may then provide (at 1350) the graphic code(s) to the user and end. The codes may be provided in various appropriate ways (e.g., by sending each code to a client application of some embodiments, by making the codes available through a web site feature associated with the user's account, by emailing the codes to the user, etc.).

One of ordinary skill in the art will recognize that process 1300 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

D. URL Access and Data Exchange

Figure 14:
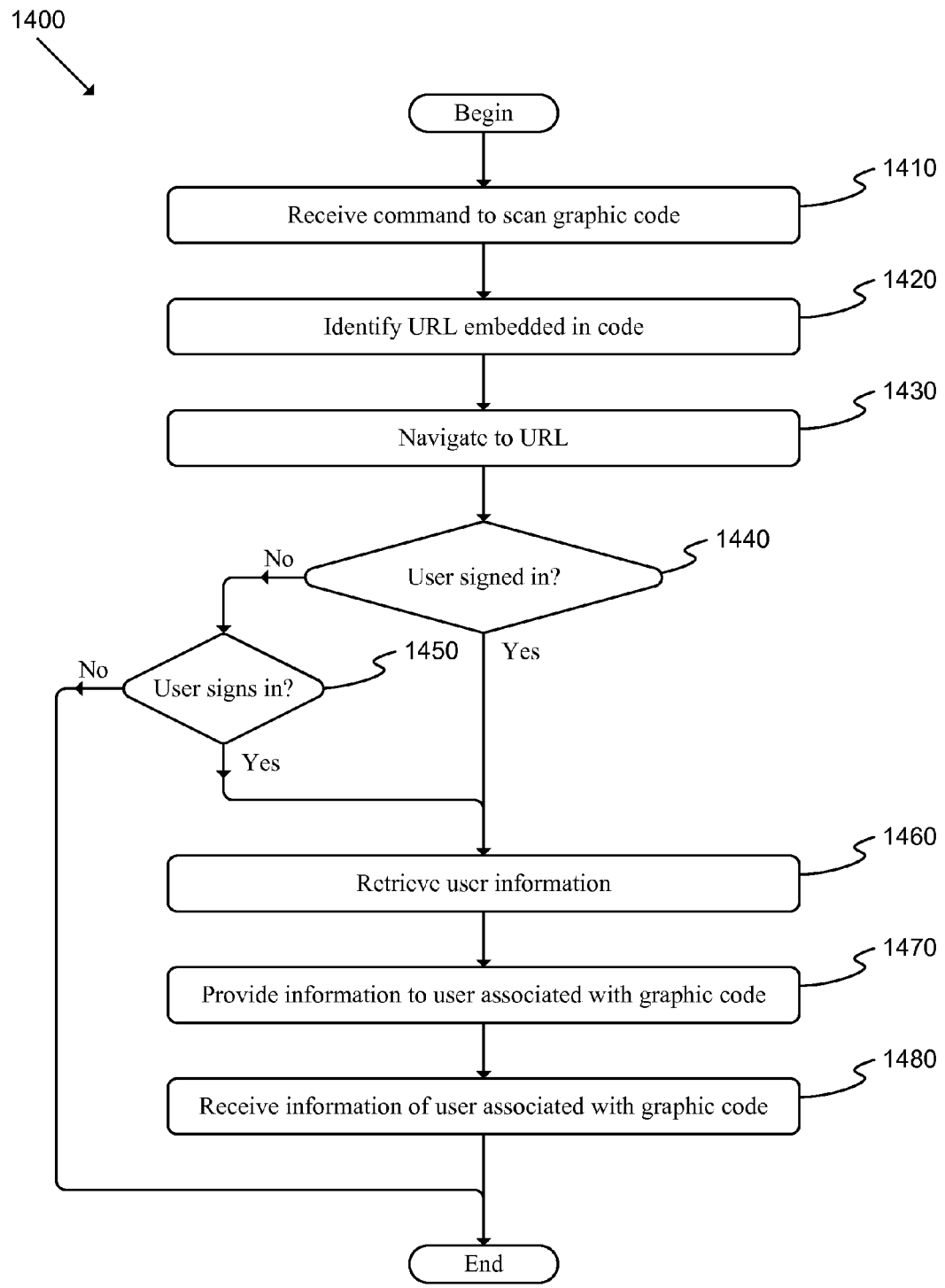
FIG. 14 illustrates a flow chart of a conceptual client-side process used by some embodiments to provide data exchange based on access of an exchange URL.

FIG. 14 illustrates a flow chart of a conceptual client-side process 1400 used by some embodiments to provide data exchange based on access of an exchange URL. Such a process may begin when, for example, a user launches a client application of some embodiments.

As shown, the process may receive (at 1410) a command to scan a graphic code. Such a command may be received in various appropriate ways (e.g., a user may launch a client application of some embodiments and use various user interface elements (e.g., a button) to initiate scanning of a code.

Next, the process may identify (at 1420) a URL embedded in the code. Such identification may be performed by evaluating the scanned code to extract the embedded data and identifying at least a portion of the extracted data as the URL.

The process may then navigate (at 1430) to the URL. Such navigation may be performed internally using a client application of some embodiments. Alternatively, a user may be directed to the URL using a separate web browser.

Next, the process may determine (at 1440) whether the user is signed in to a system account of some embodiments. Such a determination may be made in various appropriate ways (e.g., a cookie on a user device may be analyzed to determine whether the user is signed in).

If the process determines (at 1440) that the user is not signed in, the process may then determine (at 1450) whether the user signs in. For instance, if the process determines that the user is not signed in, the user may be prompted to enter sign-in information (e.g., username, password, etc.) at that time. Alternatively, the user may create a new account.

If the process determines (at 1450) that the user does not sign in (e.g., the user does not have an account or is not able to supply verifiable sign-in information, the process may end.

If the process determines (at 1440) that the user is already signed in or the process determines (at 1450) that the user signs in (or creates an account), the process may then retrieve (at 1460) user information associated with the user that scanned the code.

Next, the process may provide (at 1470) the retrieved information to the user associated with the scanned code. The information may be provided in various appropriate ways (e.g., a message may be sent to the server of some embodiments such that the information may be retrieved by the user, the information may be queued to be retrieved by the user, etc.).

The process may then receive (at 1480) information regarding the user associated with the scanned code. Different sub-sets of information may be provided, depending on various appropriate parameters. Such sharing of information will be described in more detail in reference to FIG. 16 below.

In some embodiments, the information exchanged among users may include contact information. However, other types of information may be shared as well (e.g., tracking information may be shared among multiple entities when a code is associated with a product or package, information regarding a user's position and/or local environment may be shared with a user that scans a code placed at a particular location (and/or the user's information may be shared with the provider of the code), etc.).

One of ordinary skill in the art will recognize that process 1400 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

If a user updates the information associated with the user (e.g., contact information such as address, phone, etc.) the information may be automatically updated at each clone of that information that is associated with a different user's contact. Some embodiments may make updates to each user's contact list each time a sub-entity's information is update (and/or at regular intervals, each time a user accesses to the system, etc.).

Figure 15:
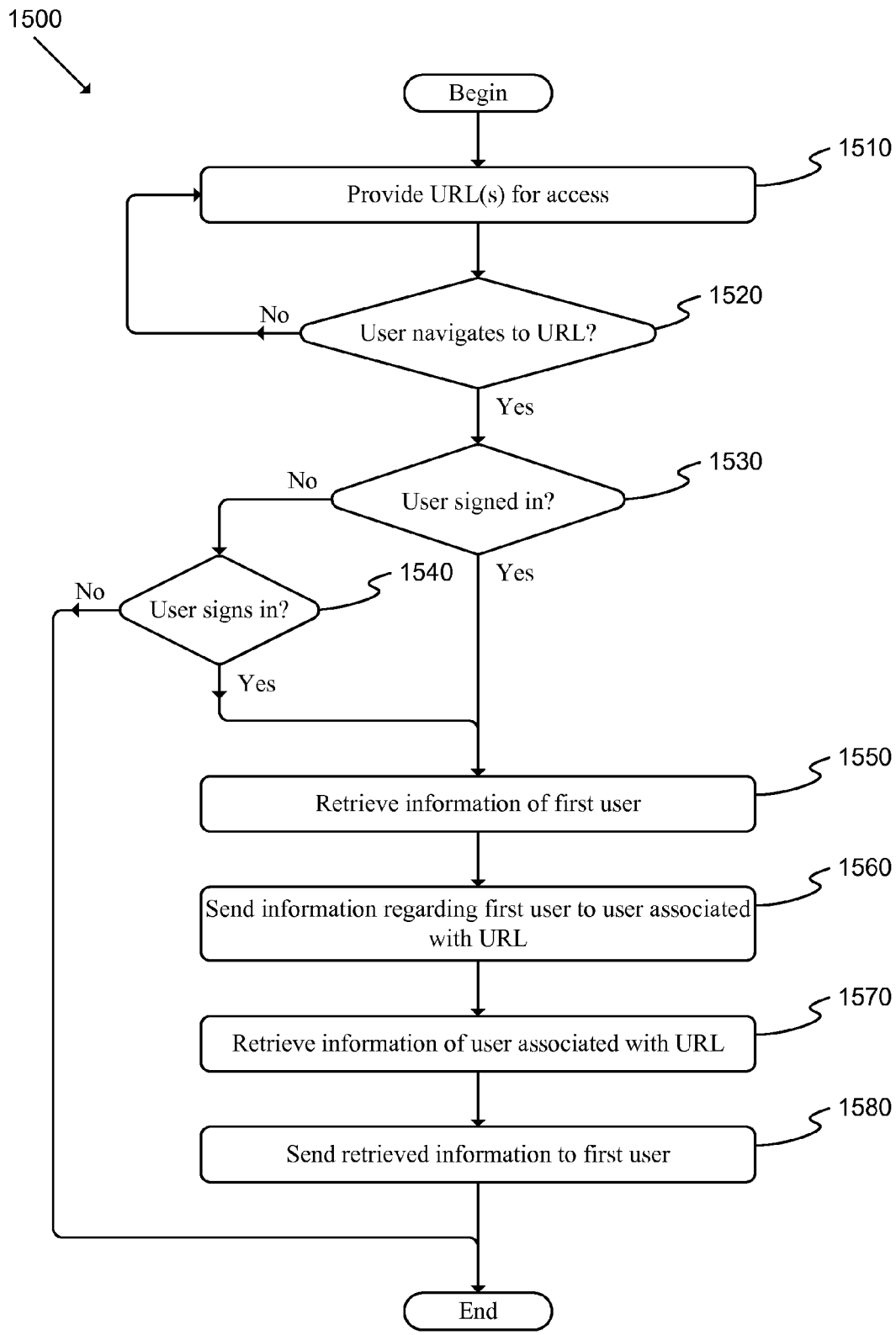
FIG. 15 illustrates a flow chart of a conceptual server-side process used by some embodiments to provide data exchange based on access of an exchange URL.

FIG. 15 illustrates a flow chart of a conceptual server-side process 1500 used by some embodiments to provide data exchange based on access of an exchange URL. Such a process may begin, for instance, when a user scans a code, accesses a URL, and/or at other appropriate times.

As shown, the process may provide (at 1510) various URLs for access. For instance, some embodiments may host a web page or site and associate each URL to a web page. Next, the process may determine (at 1520) whether a user (or other party) has navigated to the URL. Such a determination may be made in various appropriate ways (e.g., based on a message received from a client application, based on the URL being accessed through a web browser, etc.).

If the process determines (at 1520) that no user has navigated to a URL, the process may return to operation 1510 and repeat operations 1510-1520 until the process determines (at 1520) that a user has navigated to the URL.

If the process determines (at 1520) that a user has navigated to a URL, the process may then determine (at 1530) whether the user is signed in to an account of some embodiments. Such a determination may be made in various appropriate ways (e.g., a message may be received from a client application of some embodiments, a cookie on the user device may be evaluated, etc.).

If the process determines (at 1530) that the user has not signed in, the process then may determine (at 1540) whether the user signs in at that time. If the process determines (at 1540) that the user does not sign in, the process may end.

Alternatively, if the process determines (at 1530) that the user is already signed in, or determines (at 1540) that the user signs in, the process may then retrieve (at 1550) information associated with the first user (i.e., the user that accessed the URL). Next, the process may send (at 1560) the retrieved information to the user associated with the URL.

The process may then retrieve (at 1570) information regarding the user associated with the URL, send (at 1580) the retrieved information to the first user, and then end. Different sub-sets of information may be provided, depending on various appropriate parameters. Such sharing of information will be described in more detail in reference to FIG. 16 below.

One of ordinary skill in the art will recognize that process 1500 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

E. Information Sharing

Figure 16:
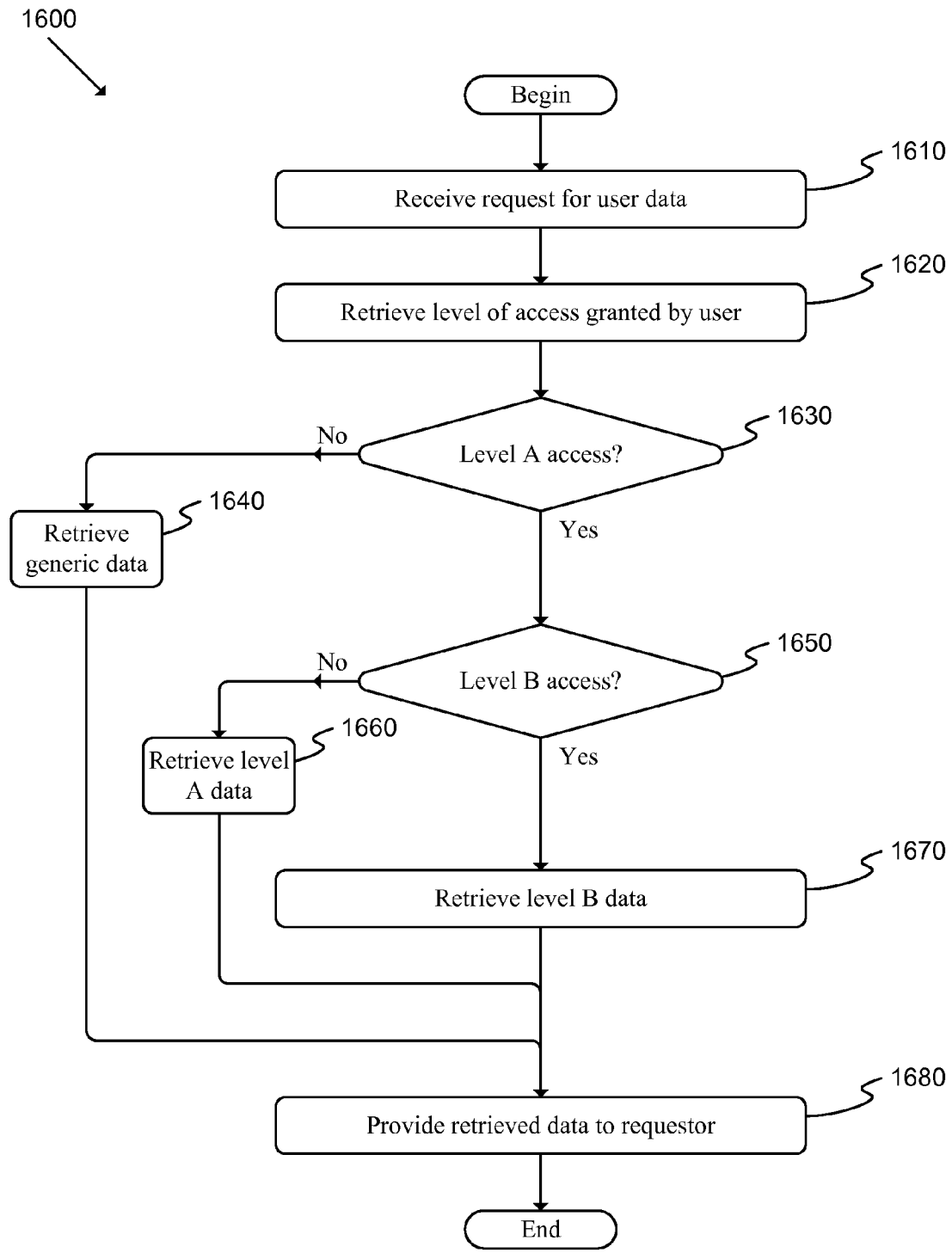
FIG. 16 illustrates a flow chart of a conceptual server-side process used by some embodiments to determine which subset(s) of user information should be provided to a requestor.

FIG. 16 illustrates a flow chart of a conceptual server-side process 1600 used by some embodiments to determine which sub-set(s) of user information should be provided to a requestor. Such a process may begin, for instance, when user information associated with a graphic code is to be provided to a user that has scanned the code. In addition, some embodiments may allow a user that scans a code to determine which sub-set(s) of information may be shared with the user or entity associated with the code.

A user may wish to provide various different sub-sets of information based on various appropriate parameters. For instance, a user may select default sharing settings when creating an account, a user may select particular sharing settings (e.g., share all information, share a particular sub-set of information, etc.). In addition, a user may wish to share different types of information with different parties (e.g., a user may wish to share only work contact information at a work-related event but may wish to share only personal contact information at a hobby-related event, a user may wish to never share the user's cellular phone number, a user may wish to personally approve every data transfer, etc.).

As shown, the process may receive (at 1610) a request for user data. Such a request may be received as described above in reference to process 1400 or process 1500. Next, the process may retrieve (at 1620) a level of access granted by the user associated with the requested data. The access level may be retrieved in various appropriate ways (e.g., a server may retrieve information related to a user's account settings, a client application may request confirmation from a user, etc.).

Based on the retrieved access level, the process may then determine (at 1630) whether a requesting user has "level A" access. If the process determines that the requesting user does not have level A access, the process may retrieve (at 1640) generic data associated with the user (e.g., name, picture, etc.).

If the process determines (at 1630) that the requesting user has level A access, the process may then determine (at 1650) whether the user has "level B" access. If the process determines that the requesting user does not have level B access, the process may retrieve (at 1660) level A data. If the process determines (at 1650) that the requesting user has level B access, the process may then retrieve (at 1670) level B data.

After retrieving (at 1640, 1660, or 1670) the appropriate data, the process may provide (at 1680) the retrieved data to the requesting user and then end. Alternatively, the process may indicate various fields or elements that may be included in the data provided to the requestor, and the associated data may be provided by another process.

One of ordinary skill in the art will recognize that process 1600 may be implemented in various different ways without departing from the spirit of the invention. For instance, various specific operations may be omitted, various other operations may be included, and/or various operations may be performed in various different orders. In addition, the process may be performed as a sub-process of a larger macro-process or be broken into multiple sub-processes. Furthermore, the process may be implemented continuously, at regular intervals, and/or based on some criteria.

IV. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors ("DSP"), Application-Specific ICs ("ASIC"), Field Programmable Gate Arrays ("FPGA"), etc.) the instructions cause the computational element(s) to perform actions specified in the instructions.

Figure 17:
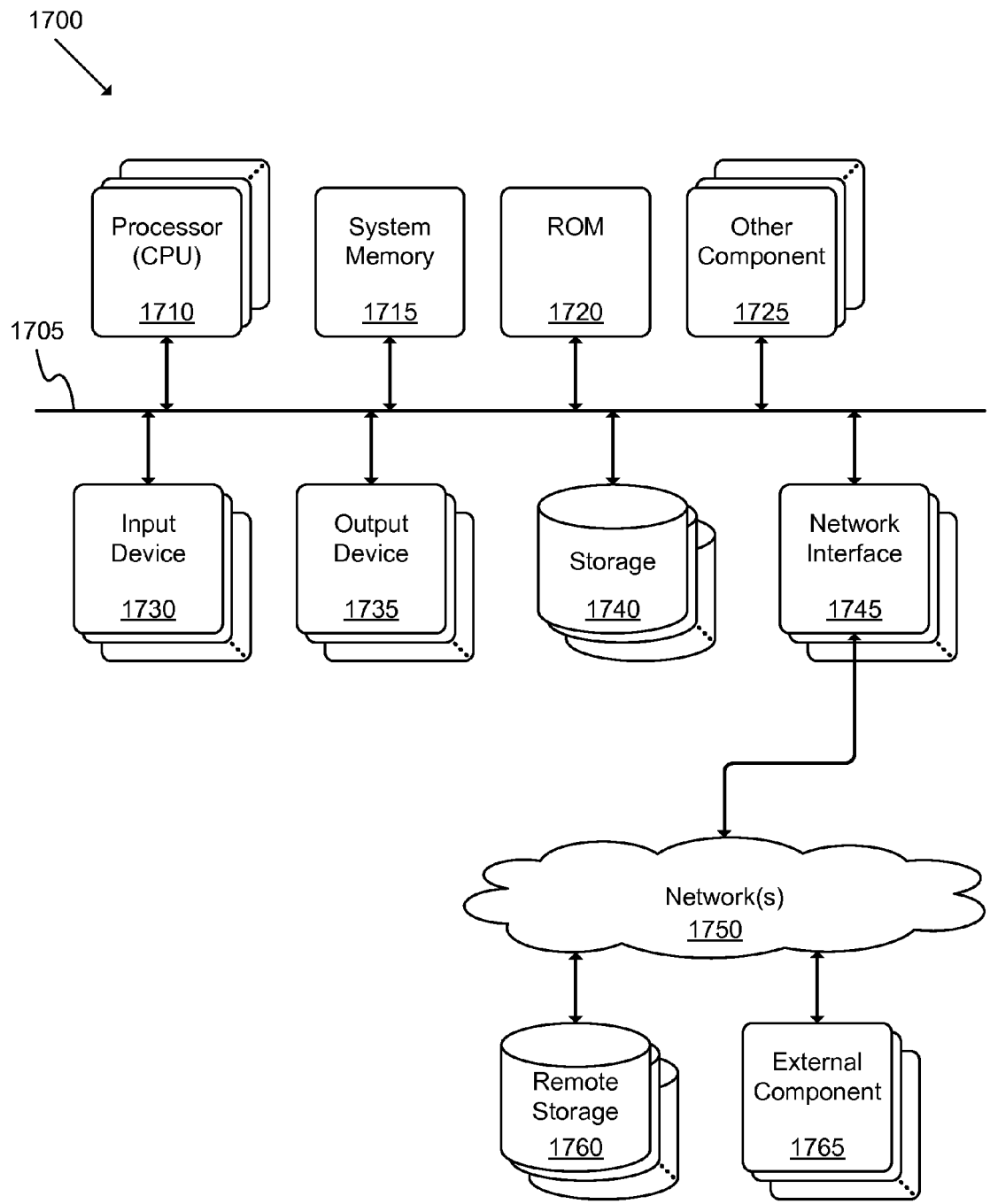
FIG. 17 conceptually illustrates a schematic block diagram of a computer system with which some embodiments of the invention may be implemented.

FIG. 17 conceptually illustrates a schematic block diagram of a computer system 1700 with which some embodiments of the invention may be implemented. For example, the systems described above in reference to FIGS. 1 and 3 may be at least partially implemented using computer system 1700. As another example, the processes described in reference to FIGS. 2 and 9-16 may be at least partially implemented using sets of instructions that are executed using computer system 1700.

Computer system 1700 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 1700 may include a bus 1705, at least one processing element 1710, a system memory 1715, a read-only memory ("ROM") 1720, other components (e.g., a graphics processing unit) 1725, input devices 1730, output devices 1735, permanent storage devices 1740, and/or network interfaces 1745. The components of computer system 1700 may be electronic devices that automatically perform operations based on digital and/or analog input signals.

Bus 1705 represents all communication pathways among the elements of computer system 1700. Such pathways may include wired, wireless, optical, and/or other appropriate communication pathways. For example, input devices 1730 and/or output devices 1735 may be coupled to the system 1700 using a wireless connection protocol or system. The processor 1710 may, in order to execute the processes of some embodiments, retrieve instructions to execute and data to process from components such as system memory 1715, ROM 1720, and permanent storage device 1740. Such instructions and data may be passed over bus 1705.

ROM 1720 may store static data and instructions that may be used by processor 1710 and/or other elements of the computer system. Permanent storage device 1740 may be a read-and-write memory device. This device may be a non-volatile memory unit that stores instructions and data even when computer system 1700 is off or unpowered. Permanent storage device 1740 may include a mass-storage device (such as a magnetic or optical disk and its corresponding disk drive).

Computer system 1700 may use a removable storage device and/or a remote storage device as the permanent storage device. System memory 1715 may be a volatile read-and-write memory, such as a random access memory ("RAM"). The system memory may store some of the instructions and data that the processor uses at runtime. The sets of instructions and/or data used to implement some embodiments may be stored in the system memory 1715, the permanent storage device 1740, and/or the read-only memory 1720. Other components 1725 may perform various other functions, as appropriate.

Input devices 1730 may enable a user to communicate information to the computer system and/or manipulate various operations of the system. The input devices may include keyboards, cursor control devices, audio input devices and/or video input devices. Output devices 1735 may include printers, displays, and/or audio devices. Some or all of the input and/or output devices may be wirelessly or optically connected to the computer system.

Finally, as shown in FIG. 17, computer system 1700 may be coupled to a network 1750 through a network interface 1745. For example, computer system 1700 may be coupled to a web server on the Internet such that a web browser executing on computer system 1700 may interact with the web server as a user interacts with an interface that operates in the web browser. Computer system 1700 may be able to access one or more remote storages 1760 and one or more external components 1765 through the network interface 1745 and network 1750. In some embodiments, the network interface 1745 may include one or more APIs.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1700 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention may be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

I claim:

1. An automated method that shares contact information, the method comprising:
   receiving user information associated with a first user;
   generating a contact information profile (CIP) based at least partly on the user information associated with the first user;
   capturing an image of a graphic code using a user device associated with the first user;
   navigating to a uniform resource locator (URL) based at least partly on information received by capturing the image, wherein the URL and the graphic code are associated with a second user; and
   sending the CIP, via a server associated with the URL, to a database accessible to the second user.

2. The automated method of claim 1 further comprising receiving at the user device associated with the first user, via the server associated with the URL, user information associated with the second user.

3. The automated method of claim 2, wherein the URL comprises at least a sub-set of characters that are at least partly derived from the user information associated with the second user.

4. The automated method of claim 2, wherein the graphic code is a bar matrix code that is generated based at least partly on the user information associated with the second user.

5. The automated method of claim 1, wherein receiving user information and generating the CIP are performed during an initial sign-up and the CIP is stored for future use.

6. The automated method of claim 5, wherein capturing the graphic code, navigating to the URL, and sending the CIP are performed a plurality of times using the stored CIP.

7. The automated method of claim 1, wherein the CIP comprises at least one of a set of static information fields and a set of links to user information sources.

8. A user device that shares contact information, the user device comprising:
   a processor for executing sets of instructions; and
   a non-transitory medium that stores the sets of instructions, wherein the sets of instructions:
      receive user information associated with a first user;
      generate a contact information profile (CIP) based at least partly on the user information associated with the first user;
      capture an image of a graphic code using a user device associated with the first user;

navigate to a uniform resource locator (URL) based at least partly on information received by capturing the image, wherein the URL and the graphic code are associated with a second user; and send the CIP, via a server associated with the URL, to a database accessible to the second user.

9. The user device of claim 8, wherein the sets of instructions further receive, at the user device associated with the first user, via the server associated with the URL, user information associated with the second user.

10. The user device of claim 9, wherein the URL comprises at least a sub-set of characters that are at least partly derived from the user information associated with the second user.

11. The user device of claim 9, wherein the graphic code is a bar matrix code that is generated based at least partly on the user information associated with the second user.

12. The user device of claim 8, wherein user information is received and the CIP is generated during an initial sign-up and the CIP is stored for future use.

13. The user device of claim 12, wherein the graphic code is captured, the URL is navigated to, and the CIP is sent a plurality of times using the stored CIP.

14. The user device of claim 8, wherein the CIP comprises at least one of a set of static information fields and a set of links to user information sources.

15. A server that shares contact information, the server comprising:
 a processor for executing sets of instructions; and
 a non-transitory medium that stores the sets of instructions, wherein the sets of instructions:
  receive, at the server, user information from a user device associated with a first user;
  generate, at the server, a contact information profile (CIP) based at least partly on the user information associated with the first user;
  receive, at the server, a captured image of a graphic code from the user device associated with the first user;
  send, to the user device associated with the first user, a uniform resource locator (URL) based at least partly on information received by scanning the image, wherein the URL and the graphic code are associated with a second user; and
  send the CIP, via a server associated with the URL, to a database accessible to the second user.

16. The server of claim 15, wherein the sets of instructions further send, to the user device associated with the first user, via the server associated with the URL, user information associated with the second user.

17. The server of claim 16, wherein the URL comprises at least a sub-set of characters that are at least partly derived from the user information associated with the second user.

18. The server of claim 16, wherein the graphic code is a bar matrix code that is generated based at least partly on the user information associated with the second user.

19. The server of claim 15, wherein user information is received and the CIP is generated during an initial sign-up and the CIP is stored for future use.

20. The server of claim 19, wherein the CIP comprises at least one of a set of static information fields and a set of links to user information sources.

\* \* \* \* \*